United States Patent [19]

Lohaus

[11] Patent Number: 5,725,080
[45] Date of Patent: Mar. 10, 1998

[54] CLUTCH FOR MOTOR VEHICLES HAVING A CLUTCH DISC WITH SPRING ELEMENTS CONNECTED IN SERIES

[75] Inventor: Norbert Lohaus, Schweinfurt, Germany

[73] Assignee: Fichtel & Sachs AG, Schweinfurt, Germany

[21] Appl. No.: 621,162

[22] Filed: Mar. 22, 1996

[30] Foreign Application Priority Data

Mar. 24, 1995 [DE] Germany .................. 195 10 833.7

[51] Int. Cl.$^6$ .................. F16D 13/64; F16F 15/12
[52] U.S. Cl. .................. 192/70.17; 192/213.22; 464/68
[58] Field of Search .................. 192/70.17, 213.22, 192/213.1, 213.21, 213.2; 464/68

[56] References Cited

U.S. PATENT DOCUMENTS

| | | |
|---|---|---|
| 2,574,573 | 11/1951 | Libby . |
| 4,188,805 | 2/1980 | Fall et al. . |
| 4,401,201 | 8/1983 | Gatewood .................. 192/213.31 |
| 4,573,945 | 3/1986 | Kajitani et al. .................. 192/213.31 X |
| 4,577,742 | 3/1986 | Saida .................. 192/213.22 |
| 4,591,348 | 5/1986 | Takeuchi et al. . |
| 4,684,007 | 8/1987 | Maucher . |
| 4,690,660 | 9/1987 | Hashimoto . |
| 5,090,543 | 2/1992 | Takeuchi .................. 192/213.31 X |
| 5,163,875 | 11/1992 | Takeuchi .................. 192/213.31 X |
| 5,542,516 | 8/1996 | Wack .................. 192/213.22 X |
| 5,588,518 | 12/1996 | Feldhaus .................. 464/68 X |

FOREIGN PATENT DOCUMENTS

| | | |
|---|---|---|
| 8004842 | 8/1980 | Germany . |
| 3400199 | 7/1984 | Germany . |
| 3404606 | 8/1984 | Germany . |
| 3313850 | 10/1984 | Germany . |
| 2066416 | 7/1981 | United Kingdom . |
| 2093564 | 9/1982 | United Kingdom . |

*Primary Examiner*—Rodney H. Bonck
*Attorney, Agent, or Firm*—Nils H. Ljungman and Associates

[57] ABSTRACT

The present invention relates to a clutch disc in which the output part is composed of two elements which on one hand run alongside a hub disc for an idle device, and on the other hand are engaged by means of radial arms in apertures of an intermediate part, to apply pressure to two sets of springs which are located in those apertures and connected in series. The two-piece output part can thereby be prefabricated with the intermediate part and the hub disc for the idle damper as a separate unit.

11 Claims, 8 Drawing Sheets

CLUTCH FOR MOTOR VEHICLES HAVING A CLUTCH DISC WITH SPRING ELEMENTS CONNECTED IN SERIES

BACKGROUND OF THE INVENTION

FIELD OF THE INVENTION

The present invention generally relates to a clutch disc, in particular for a friction clutch in the drive train of a motor vehicle, comprising a friction lining which is non-detachably connected with one of two disc-shaped cover plates (which cover plates are non-detachably connected to one another and are held at an axial distance from one another as the input part), a disc-shaped component realized as the output part between the two cover plates (which disc-shaped component is non-rotationally connected to a hub), a disc-shaped intermediate part between the two cover plates, spring apertures in the input parts, in the intermediate part and in the output part for the installation of spring elements, whereby one set of spring elements is effectively located between the input parts and the intermediate part, and one set of spring elements is located between the intermediate part and the output part, and thus the respective spring element of the one set and of the other set are connected in series.

BACKGROUND INFORMATION

A known clutch disc, similar to that described hereinabove, is described in U.S. Pat. No. 2,574,573. In this clutch disc, located laterally on a hub disc which is non-detachably connected to the hub, there are two intermediate parts which are guided in the radial direction on the hub, on either side of the hub disc. From this U.S. Patent document, it is essentially not apparent how a specified friction device would be effective over the load range of the torsional vibration damper. German Unexamined Patent Application 33 13 850 also discloses that the output part of a torsional vibration damper of a clutch disc can be realized in two parts, to actuate a centrally-located idle device. But in the German Unexamined Patent Application 33 13 850, it is essentially not possible, without further measures, to realize a flat spring characteristic, such as the characteristic which is increasingly required to filter out asynchronous drive movements which originate from an internal combustion engine.

OBJECT OF THE INVENTION

An object of the present invention is to create a clutch disc with a torsional vibration damper which takes up a small amount of space, has a simple construction and can produce a flat, or linear, spring characteristic, whereby an effective and efficient friction device is active at least over the entire load range.

SUMMARY OF THE INVENTION

At least one preferred embodiment of the present invention teaches that this object, as described immediately hereinabove, can essentially be accomplished by the features disclosed herein. The present invention teaches that:

a) the intermediate part is realized so that it is essentially planar, with at least one inner or outer encircling web, from which there proceed webs which run essentially radially and form spring actuator edges, whereby spring apertures are formed peripherally between two neighboring webs. Each aperture locates a spring element of one set of spring elements and one spring element of another set of spring elements, and between the spring elements there is space for control arms of an output part;

b) the output part includes two components, each having control arms which run radially, in the vicinity of which control arms the two components can be non-rotationally connected to one another. The control arms extend at least peripherally into the spring apertures of the intermediate part and form control edges for the spring elements. The control arms end radially inwardly in disc-shaped inner areas which are axially separated from one another at least by the thickness of the intermediate part, and the inner areas are non-rotationally connected to the hub; and c) a friction device is located radially inside the spring elements and axially between the inner sides of the cover plates and the outer sides of the inner areas of the components of the output part.

As a result of the characteristics described immediately hereinabove, a construction is defined which, because of a series connection of the spring elements, is able to realize a large angle of rotation, making it possible to achieve a relatively flat spring characteristic. As a result of the two-piece configuration of the output part, which at least radially inside the spring elements runs alongside the intermediate part, it is possible to provide a simply-constructed load friction device which is effective over the entire range of angle of rotation.

Thus the present invention makes it possible to essentially not have any interruptions or sudden discontinuities in the generation of the friction device over the curve of the relatively flat spring characteristic.

An additional characteristic of the present invention is that at least the control arms of one of the two components are bent at substantially a right angle toward the other, and thus extend axially into the spring apertures of the intermediate part. Of course, the control arms can run alongside the intermediate part, but with the substantially right-angle bend taught by at least one embodiment of the present invention, a realization which essentially takes up little space axially becomes possible. Thus the control arms of the two components can be bent at substantially right angles toward one another, so that the control arms of both components extend axially into the spring apertures of the intermediate part. This construction can be particularly advantageous, in particular when the spring elements used in these apertures are equipped with internal springs, so that the cover plates with their actuation areas should also extend in the axial direction to actuate the inwardly-located spring elements.

The present invention also teaches that the friction device can include a spring, such as an ondular washer, and a friction ring. Such a configuration of a friction device can be realized with only a few individual parts, and essentially can thus easily be installed without taking up a great deal of space.

At least one embodiment of the present invention teaches that it can be advantageous if the disc-shaped areas of the two components of the output part with internal gear teeth are non-rotationally engaged in external gear teeth of the hub. Such a connection of the two-piece output part to the hub can be made relatively simply, and can make easy and unrestricted movement possible with regard to differently-configured clutch discs of the same type, and with regard to the axial correspondence between the individual components.

The present invention also teaches that the intermediate part has at least one inner encircling web. Located axially between the disc-shaped areas and radially inside the web there is a hub disc which is non-rotationally connected to the hub. The hub disc is part of an idle spring device and has spring apertures for the installation of idle spring elements. The idle spring elements can be actuated by means of actuation edges in both components of the output part, and the internal gear teeth of the components of the output part are engaged with peripheral play, or clearance, corresponding to the range of action of the idle spring device in the external gear teeth of the hub. When a clutch disc is used with an idle spring device, it is thereby possible to provide a hub disc located axially between the two disc-shaped areas of the components of the outpur part and radially inside the inner encircling web of the intermediate part. The hub disc is provided with spring apertures for the installation of idle spring elements, which spring elements can be actuated by means of actuator edges in the two components of the output part. Such a construction, while retaining the essential components, makes the optional use of an idle spring device possible. The idle spring device is thereby installed in a manner which saves space both in the axial and in the radial direction. Furthermore, as contemplated in accordance with one embodiment of the present invention, the external gear teeth of the hub can be used both for non-rotational connection with the hub disc essentially without any play, and also for non-rotational connection with some play between with the two parts of the output part.

The intermediate part, of course, can theoretically have an inner encircling web or an outer encircling web, but the use of the two webs can essentially result in a component which is significantly more stable from the point of view of strength.

In one advantageous refinement of the teaching of the present invention, the idle spring device is realized in the form of a prefabricated subassembly, comprising at least the two components of the output part (which two components are connected to one another at least in the axial direction), the intermediate part, the hub disc and the idle spring elements. Such a subassembly can be easily tested in terms of its operation before the complete assembly of the clutch disc, and the relatively small idle spring elements can be held in a captive manner by means of the subassembly, and can thus be easily combined with the other components of the clutch disc.

In an additional embodiment of the present invention, the axial guidance of the components of the output part is provided:

a) by the inner areas of the cover plates, which inner areas are located alongside the external gear teeth of the hub, and b) by the parts of the friction device. Thus the axial correspondence of the parts of the output part is determined indirectly by the end surfaces of the external gear teeth of the hub.

The present invention also teaches that the one cover plate is guided radially by means of a sliding/friction element on a cylindrical guide diameter of the hub, and this sliding/friction element is in contact axially against the end surface of the external gear teeth of the hub, and there is at least one spring element between the other cover plate and the end surface of the gear teeth facing it. As a result of this arrangement, the cover plates and all the components which rotate in relation to the hub are guided in the radial direction, and the axial correspondence is created by the sliding/friction element in connection with the spring, whereby these parts essentially simultaneously guarantee the basic friction of the clutch disc.

The present invention teaches that the control arms of the output components are provided in their radially outer areas with extensions which point in the circumferential direction, and which together with stop edges on the radially outer web, of the intermediate part, represent a stop providing anti-blocking protection for the spring elements. In this structurally very simple manner, the spring elements are protected against an overload when the maximum torque is applied to them.

When the corresponding load is applied, an additional anti-blocking protection for the corresponding spring elements is provided in that the connecting elements of the cover plates are located in the form of spacer rivets in notches, which notches run peripherally and are open toward the radial outside in the outer web of the intermediate part, and the spacer rivets together with the peripheral limiting edges of the notches form stops to provide anti-blocking protection for the spring elements. Depending on the directions in which the load is exerted, the one anti-blocking protection mechanism acts for the one set of spring elements, and the other anti-blocking mechanism provides protection for the other set.

In accordance with at least one embodiment of the present invention, the intermediate part is provided at least with an inner encircling web, by means of which web the intermediate part is axially guided between the inner walls of the disc-shaped areas of the components of the output part, with the interposition of friction/sliding elements. It is thereby essentially guaranteed that the intermediate part comes into contact under all conditions with the friction/sliding elements. At this point, as the result of an appropriate choice of the materials of the friction and sliding elements, the intermediate part is essentially subjected only to small frictional force in the event of a relative movement, and cannot come into contact with the other components.

In accordance with an additional embodiment of the present invention, however, it is also possible to involve the friction/sliding elements (in a controlled manner) in the process to generate the friction force, by separating the control arms of the components of the output part from one another by means of an axial gap, and by using the load friction device with its ondular washer, which is already present anyway, to generate an axial clamping of the web of the intermediate part. Thus the intermediate part is fixed in place both axially and also as a result of a controlled friction clamping to generate a load friction. This load friction, however, acts only in the event of a relative movement between the intermediate part and the disc-shaped areas of the components of the output part.

In addition, the friction/sliding elements can be guided radially by means of one-piece webs which run axially and which extend into the space between the outside diameter of the hub disc and the inside diameter of the web. The radial guidance at this point can be particularly advantageous, since the radial guidance takes advantage of the radial limit stops of the web or of the hub disc, which web and hub disc are already present anyway.

In accordance with an additional embodiment of the present invention, it is even possible to guide the intermediate part by means of the webs of the friction/sliding elements on the outside diameter of the hub disc. Since the hub disc is firmly fixed in the radial direction, so to speak, as a result of the non-rotational connection of the hub disc without play on the external gear teeth of the hub, it is possible to provide a radially correct guidance of the intermediate part at this point.

The present invention teaches that the hub disc of the idle spring device is fixed in place axially between the areas of the components of the output part. By means of a corresponding configuration it is therefore possible to specify the axial position of the hub disc of the idle spring device.

The hub disc can be advantageously realized in the form of a plastic component. Such an embodiment is not only economical to manufacture and lightweight, but an appropriate selection of the plastic can also make it possible to achieve a very low coefficient of friction in the idle range.

As a result of the use of plastic as the material for the hub disc, the hub disc can be used directly as the radial guide element for the intermediate part.

It is thereby possible to generate a controlled idle friction as a result of the installation of an ondular washer between the hub disc and one of the areas of the output part.

In a particularly advantageous manner, the friction lining can have a ratio of outside diameter $D_A$ to inside diameter $D_I$ of less than 1.4, and the ratio of the outside diameter $D_A$ of the friction lining to the outside diameter $D_a$ of the cover plates can be less than or equal to 1.4. Such a realization creates space in the radial direction for the installation of the spring elements, whereby both a desired flat spring characteristic can be achieved, as well as a sufficiently large stopping moment in the terminal range of the angle of rotation. In particular, it has essentially been determined that when the ratio of the outside diameter to the inside diameter is less than 1.4, the transmission capability of the clutch disc can assume a higher value than with a conventional diameter ratio. This advantage is due in particular to the fact that during the slip phase of the operation of the friction clutch, and during the heating of the friction linings, the friction linings with the diameter ratio taught by the present invention are subject to less warping, so that a greater percentage of the friction surface of the friction linings can come into contact with the matching friction surface of the friction clutch. It is thereby essentially guaranteed that the heat of friction which is produced can be distributed more uniformly over the material of the friction lining, and thus the peak loads can be significantly reduced.

It has also essentially been determined to be advantageous if at least the springs of one set of spring elements have a ratio of outside diameter to length in the relaxed state which is greater than or equal to 0.7. As a result of such a size, it is possible to utilize the available installation space optimally, and thereby achieve the maximum energy content with regard to this installation space.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a friction clutch assembly for a friction clutch for a motor vehicle, the friction clutch assembly comprising: a flywheel; a clutch housing; a hub defining an axis of rotation and an axial direction parallel to the axis of rotation; a clutch disc disposed within the clutch housing, the clutch disc coaxially surrounding the hub; pressure plate means disposed within the clutch housing and being movable in the axial direction, the pressure plate means for applying an axial force to the clutch disc along the axial direction; biasing means for biasing the pressure plate means in the axial direction; a hub member; the hub member being disposed to coaxially surround the hub; the clutch disc being disposed between the flywheel and the pressure plate means; the clutch disc comprising friction lining means; the friction lining means for contacting the pressure plate means and the flywheel during engagement of the clutch disc with the flywheel; the friction lining means being disposed substantially between the pressure plate means and the flywheel; the clutch disc further comprising: at least one disc-shaped component having an axis of rotation and being coaxial with the hub; the at least one disc-shaped component comprising at least one aperture; the at least one aperture comprising a first edge, a second edge, a third edge, and a fourth edge; the first edge and the second edge being disposed substantially opposite one another with respect to the axis of rotation; the first edge having a first distance from the axis of rotation and the second edge having a second distance from the axis of rotation; the first distance being greater than the second distance; the third edge and the fourth edge of the at least one aperture extending substantially radially outward with respect to the axis of rotation and being disposed substantially opposite one another with respect to the at least one aperture; the at least one disc-shaped component comprises: a first cover plate; a second cover plate; and an intermediate part being disposed axially between the first cover plate and the second cover plate; the first cover plate and the second cover plate being connected one to another by connecting means; the friction lining means being disposed on one of the first cover plate and the second cover plate; the at least one aperture of the first cover plate, the second cover plate, and the intermediate part being aligned with one another; the aligned apertures being at least one window; the clutch disc further comprising at least one spring element; the at least one spring element having a substantially central longitudinal axis; the at least one spring element comprising a first end being substantially perpendicular to the longitudinal axis and a second end being substantially perpendicular to the longitudinal axis; the at least one spring element comprising a plurality of first spring elements and a plurality of second spring elements; one of the plurality of first spring elements and one of the plurality of second spring elements being disposed within the at least one window; the first end of the one of the plurality of first spring elements being substantially adjacent each of the third edges of the at least one window; the first end of the one of the plurality of second spring elements being substantially adjacent each of the fourth edges of the at least one window; the second end of the one of the plurality of first spring elements and the second end of the one of the plurality of second spring elements facing substantially toward one another; the at least one window having the one of the plurality of first spring elements and one of the plurality of second spring elements disposed therein being at least one spring window; the at least one spring window being a plurality of circumferentially spaced spring windows; the clutch disc further comprises at least one additional component; the at least one additional component being substantially disc-shaped and having an axis of rotation and being coaxial with the hub; the at least one additional component comprising an internal portion and an external portion; the external portion of the at least one additional component comprising at least one radially outwardly extending arm member; the at least one arm member extending at least peripherally into the at least one aperture of the intermediate part; the at least one arm member comprising a plurality of arm members; the arm members being circumferentially spaced apart from one another; the arm members each comprising an inner portion, a first edge, a second edge, and a peripheral portion; the first edge of the arm members being substantially adjacent the second end of the first spring element and the second edge of the arm members being substantially adjacent the second end of the second spring element; and the clutch disc further comprises a friction device disposed within the cover plates to reduce vibrations of elements disposed between the first cover plate and the second cover plate.

BRIEF DESCRIPTION OF THE DRAWINGS

The invention is explained in greater detail below with reference to various embodiments which are illustrated in the accompanying drawings.

DESCRIPTION OF THE PREFERRED EMBODIMENTS

Figure 1:
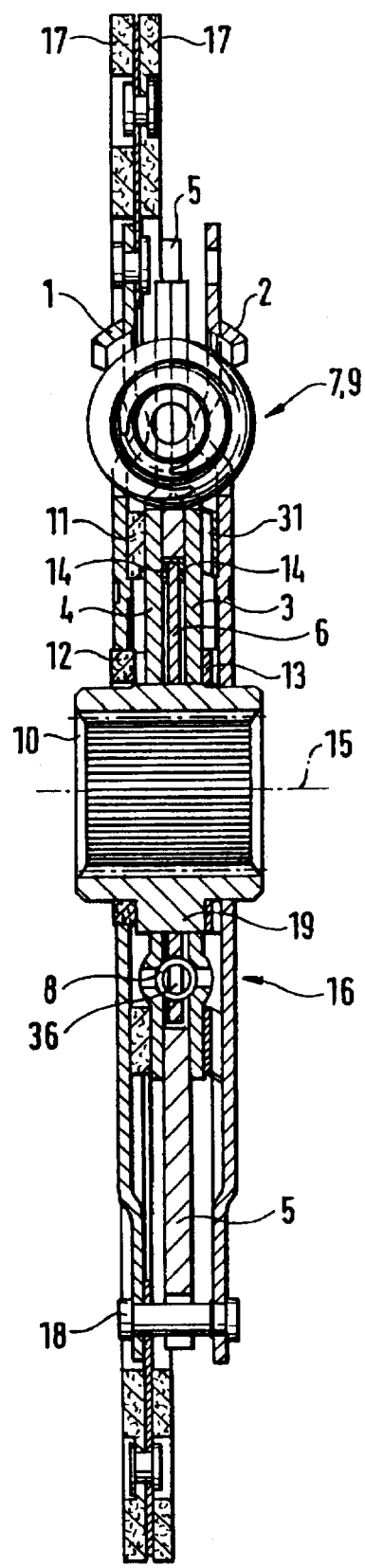
FIG. 1 is a longitudinal section through a complete clutch disc.

FIG. 1 is a schematic diagram of a longitudinal section through a clutch disc. A hub 10 with internal gear teeth for non-rotational attachment to a transmission shaft is realized so that the hub 10 can be concentric to an axis of rotation 15. The hub 10 can preferably have external gear teeth 19 which extend over a portion of the axial length of the hub 10. A plurality of components can be non-rotationally engaged in the external gear teeth 19. From the area alongside the gear teeth 19, two cover plates 1 and 2 run toward the radial outside, and one of the two cover plates 1 and 2 can carry the friction linings 17. These friction linings 17 can be riveted by means of a lining carrier on the outside diameter of the cover plate 1, but it is also theoretically possible to install the friction linings 17 directly on the cover plate 1. In the case described below, the cover plate 1 is preferably guided with respect to a guide diameter of the hub 10 by a sliding/friction element 12 which can be in lateral contact with the end surface of the external gear teeth 19. The two cover plates 1 and 2 are essentially identical to one another, with the exception of the vicinity of their inside diameter. The two cover plates 1 and 2 can be non-detachably connected to one another and held at a distance from one another by a plurality of spacer rivets 18 which can be distributed over the circumference of the cover plates 1 and 2. The cover plate 2, in the radially inner area, can be radially separated from the hub 10 and pressurized in the axial direction by a spring 13 which can be supported on the end surface of the external gear teeth 19 of the hub 10. Thus the two cover plates 1 and 2 can essentially be fixed in position with respect to the hub 10 both radially and also in the axial direction.

Figure 2:
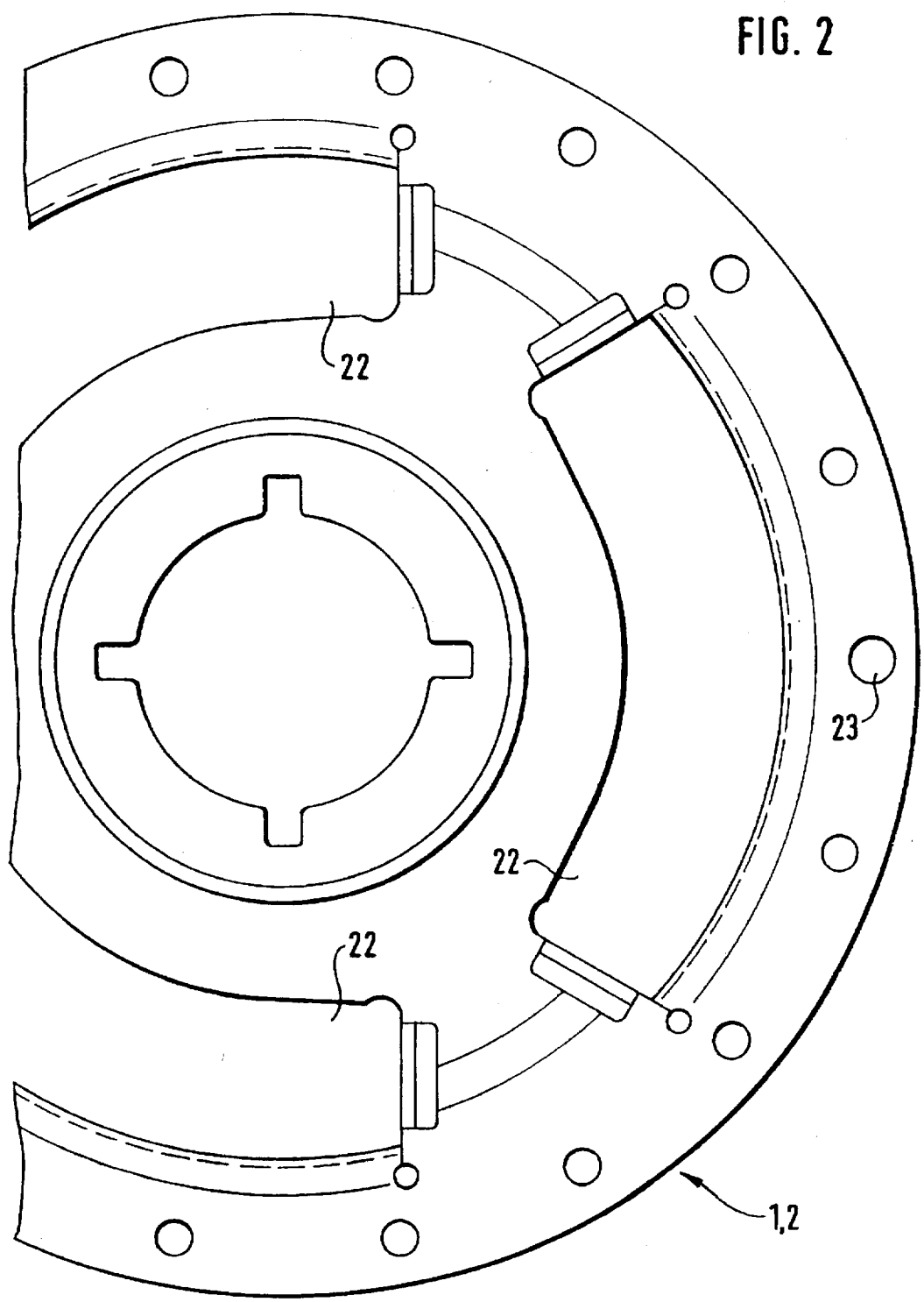
FIG. 2 is a side view of a cover plate.

The two cover plates 1 and 2, on a rather large intermediate diameter, have spring apertures 22 (shown in FIG. 2), which spring apertures 22 can extend over a wide angular range. In this case, all three of these spring apertures 22 can be distributed uniformly on the periphery. FIG. 2 shows the rivet openings 23 which are used for the fastening of the spacer rivets 18. The rivet openings 23 can be located peripherally approximately centrally above the individual spring apertures 22 and on a rather large diameter. Axially between the two cover plates 1 and 2 there are additional components which are also provided with spring apertures and are for the installation of spring elements 7, 8, and 9. These components, as shown in FIGS. 3, 3a, 4, and 5, are realized in the form of a subassembly which can be prefabricated, and include the hub disc 6 (not shown in FIGS. 3, 3a, 4, and 5), the two-part component 3 and 4, and the intermediate part 5. The two-part component 3, 4 (seen best in FIGS. 3, 3a, and 5) includes a disc-shaped area 30 which can be provided toward the radial inside with internal gear teeth 20 which can be engaged non-rotationally but with play in the circumferential direction in the external gear teeth 19 of the hub 10. On an intermediate diameter in the disc-shaped area 30, there can be a plurality of actuator edges 37 distributed around the periphery which actuate the spring elements 8 (see FIGS. 1 and 3a) of the idle spring device 16 (see FIG. 1). From the disc-shaped area 30, a plurality of control arms 28 (shown in FIGS. 3, 3a, and 5) distributed on the periphery can extend radially outward, whereby the number of control arms 28 can be determined as a function of the number of spring apertures 22 in the cover plates 1 and 2 (see FIGS. 2, 3, and 3a). These control arms 28, a total of three of them, can be uniformly distributed on the periphery. It can also be possible without any further measures to work with two control arms or with more than three control arms. The control arms 28 are preferably bent at substantially right angles in the axial direction, and the two components 3 and 4, with the control arms 28, can be assembled so that the disc-shaped areas 30 are at an axial distance from one another. The two components 3 and 4 can be riveted together in the vicinity of the control arms 28, e.g. by means of fastening rivets 29. The hub disc 6 can be located axially between the disc-shaped areas 30 (see FIGS. 7 and 8).

The substantially right-angle bends, as noted hereinabove, of the control arms 28, which bends are in the vicinity where the control arms 28 join the disc-shaped areas 30, offset the control arms 28, with respect to the disc-shaped areas 30, in an axial direction. (This can be seen best in FIGS. 1 and 8).

Figure 3:
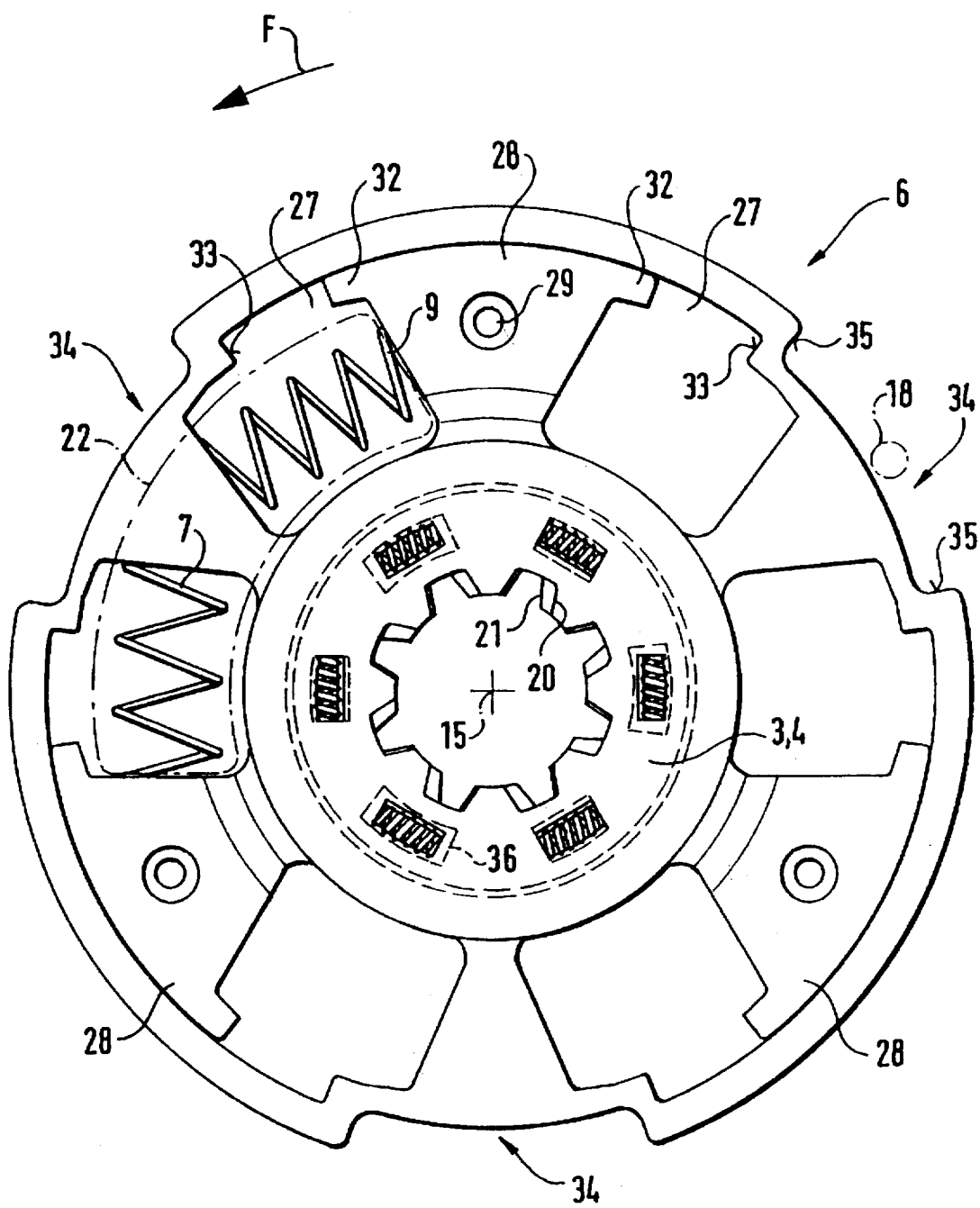
FIG. 3 is a plan view of a prefabricated assembly.
Figure 3A:
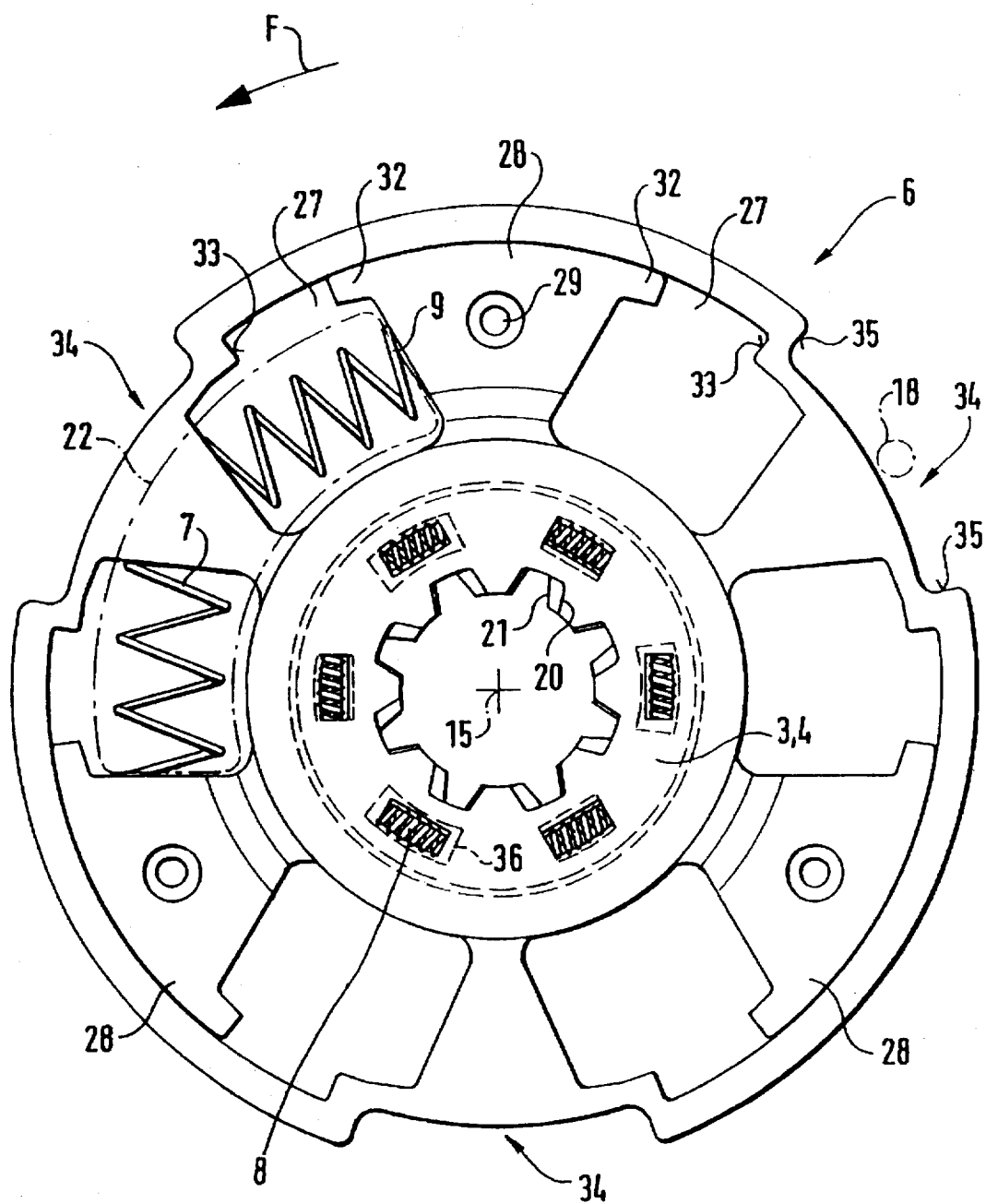
FIG. 3a is essentially the same view as FIG. 3, but more detailed.
Figure 4:
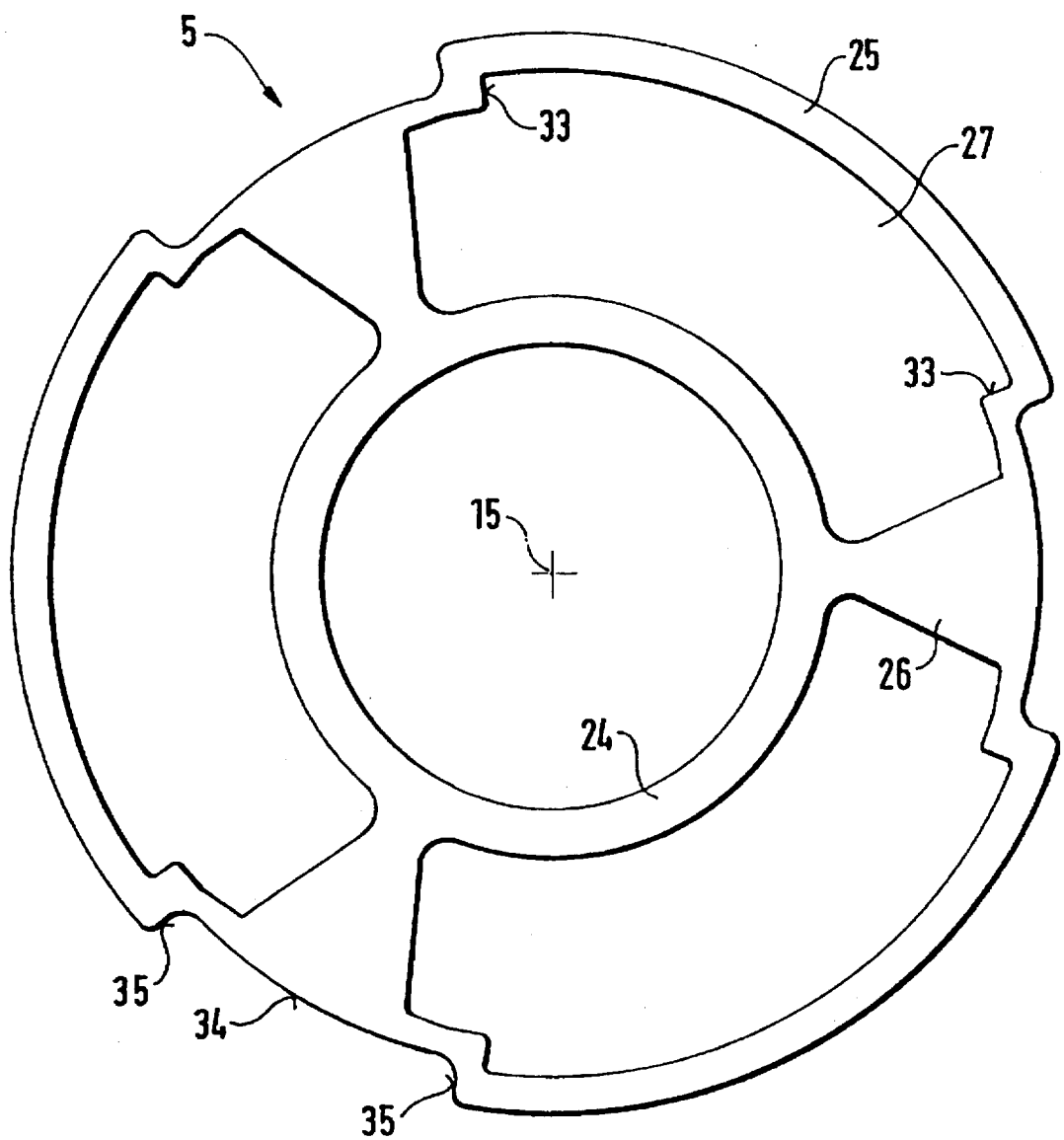
FIG. 4 is a side view of the intermediate part.

The intermediate part 5 (as shown in FIG. 4) can be radially aligned with the hub disc 6 (which alignment can be seen in FIG. 1), and have an encircling radially outer web 25 and an encircling radially inner web 24. The two webs 24 and 25 can be connected to one another by connecting webs 26 which run essentially radially, whereby in this case there can also be three connecting webs 26 distributed on the periphery. As a result of this configuration, the intermediate part 5 can have three spring apertures 27 distributed on the circumference, which would be limited in the circumferential direction by the connecting webs 26 (i.e. separated from one another by connecting webs 26). These spring apertures 27 can essentially have the same peripheral length as the spring apertures 22 in the cover plates 1 and 2. The control arms 28 of the components 3 and 4 can extend into these spring apertures 27 from both sides (see FIGS. 1, 3, 3a, and 8). When the clutch disc is in the idle position, the resulting distribution is illustrated in FIG. 3. The control arms 28 thereby end radially immediately inside the radially outer web 25 (not shown in FIG. 3). The hub disc 6 for the idle spring device 16 is preferably provided with internal gear teeth 21 which can be engaged without play in the peripheral direction in the external gear teeth 19 of the hub 10 (not illustrated in FIG. 3). The internal gear teeth 20 of the two components 3 and 4 are realized so that they have some clearance in the peripheral direction with respect to the external gear teeth 19 of the hub 10, whereby this play corresponds to the range of action of the idle spring device 16. In the hub disc 6 there can be spring apertures 36 for the installation of spring elements 8. In the two disc-shaped areas 30 (see FIG. 6) of the components 3 and 4 which run on the sides of the hub disc 6 there can be actuator edges 37 which actuate the spring elements 8 when torque is applied. The prefabricated subassembly illustrated in FIGS. 3 and 3a is fixed in the axial direction, as shown in FIG. 1, in that between the inner sides of the two cover plates 1 and 2 and the outer sides of the disc-shaped areas 30 of the components 3 and 4 there can be a load friction device comprising a friction ring 11 between the cover plate 1 and the component 4, and a spring 31 between the cover plate 2 and the component 3. As a result of the bias of the spring 31, a force is preferably exerted via the spacer rivets 18 on the friction ring 11, so that the subassembly is fixed in place axially. If necessary, thrust washers 14 can be located between the hub disc 6 and/or the intermediate part 5 in the vicinity of the friction device 11, 31. As shown in FIG. 3 in particular, there can be two sets of spring elements 7, 9 for the load range. A total of three spring elements 7 and three spring elements 9 can be distributed over the periphery. Each control arm 28 thereby separates each spring aperture 27 in the intermediate part 5 into two parts and—viewed in the peripheral direction—located in each of the partial apertures of spring apertures 27 there is one spring element of the one group 7 in one of the partial apertures of spring apertures 27 and one spring element of the other group 9 in the other of the partial apertures of spring apertures 27.

With respect to this configuration, when the complete clutch disc is assembled, care should be taken that the spring apertures 22 of the cover plates 1 and 2 comprise one spring element 9 of the one spring aperture 27 and one spring element 7 of the peripherally adjacent spring aperture 27.

Figure 5:
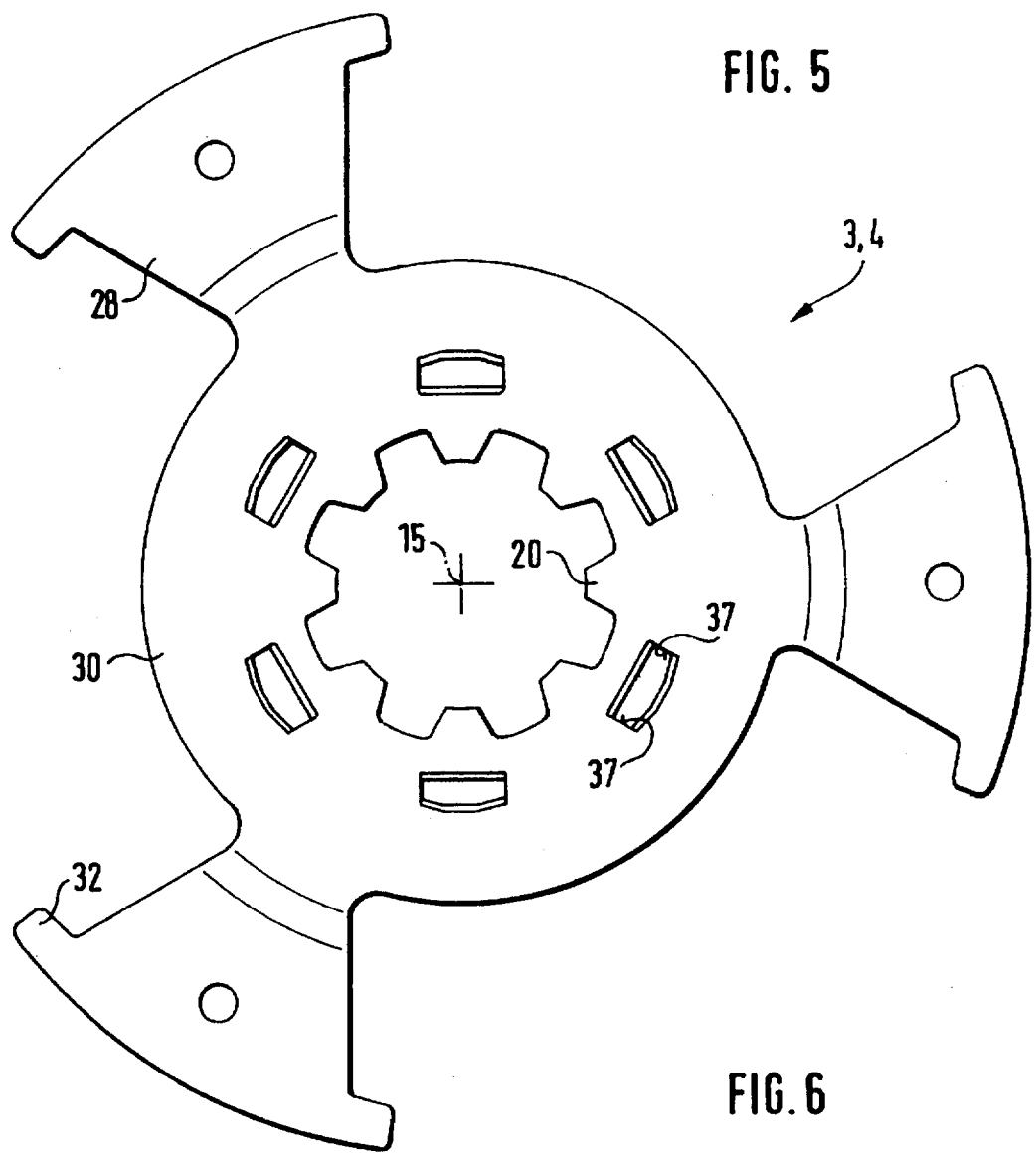
FIG. 5 is a side view of one of the two output parts.

FIGS. 3, 4, and 5 also show an angle stop limit which protects the individual springs 7, 9 from overloads. For example, the control arms 28 of the components 3 and 4 can each be provided on the periphery with an extension 32 so that each extension 32 can come into contact with a stop edge 33 of the intermediate part 5 before the corresponding spring 7, 9 is compressed into a block. Furthermore, the intermediate part 5 can be provided peripherally, in the vicinity of the connecting webs 26, with notches 34 which are open toward the radial outside, and which end peripherally in limit edges 35. These limit edges 35 can interact with the spacer rivets 18 between the two cover plates 1 and 2, so that protection would be provided against overloading of the corresponding spring elements 7, 9.

Figure 6:
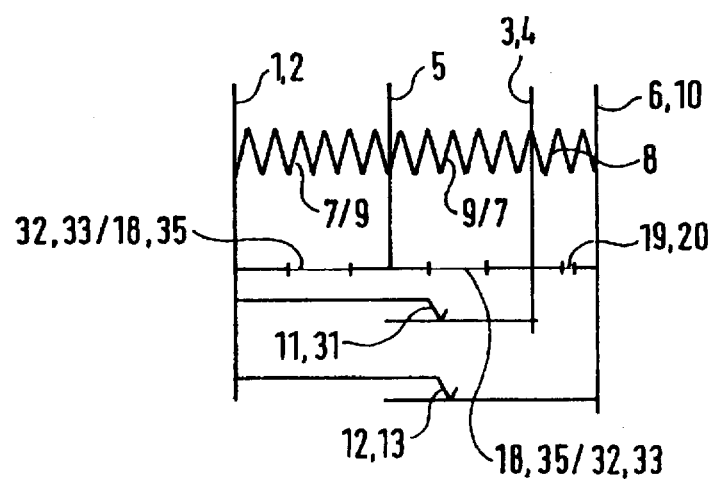
FIG. 6 is a schematic diagram explaining the operation of at least one embodiment of the present invention.

The function of the clutch disc is explained below, by reference to the schematic diagram presented in FIG. 6. The starting position is the idle position illustrated in the figures, and the beginning of the introduction of torque is indicated by Arrow F in FIG. 3. It is thereby assumed that a transmission shaft is fixed in place with the hub 10, and the friction linings 17 are loaded with torque in the direction indicated by the arrow F. In the first operating range, the load damper with the spring elements 7, 9 and the friction device 11, 31 behaves as a rigid component. The spring elements 8 of the idle spring device 16, which are held with significantly less force, are thereby compressed, whereby the hub disc 6 with internal gear teeth 21 is located non-rotationally and without play on the external gear teeth 19 of the hub 10, and the components 3 and 4 which function as the output part of the load damper can be rotated within the play of the internal gear teeth 20 with respect to the external gear teeth 19 of the hub 10. After the corresponding edges of the two sets of gear teeth 19 and 20 come into contact with one another, further compression of spring elements 8 is prevented and the idle spring device 16 is blocked, and the active range of the load damper begins. The torque which is introduced via the friction linings 17 is applied by the two cover plates 1 and 2 and their spring apertures 22 (as illustrated in FIG. 3) to the first set of three springs 9, and is transmitted by these springs 9 via the intermediate part 5, from the first set of spring elements 9 to the second set of spring elements 7, and from the second set of spring elements 7, in turn, to the control arms 28 of the output parts 3 and 4. The load friction device 11, 31 is active over the entire load range. The basic friction device, which essentially includes the friction/sliding element 12 and the spring 13, is active over the entire range of angular rotation, i.e. including the idle range. When correspondingly higher torques are applied, the limit stops 32 and 33 on one hand and 18 and 35 on the other hand, become involved in the process in order to protect the spring elements 7, 9 from essentially unallowable loads.

That is, an extension 32, of components 3, 4, contacts stop edge 33, of intermediate part 5, to limit further compression of springs 7, 9. Similarly, spacer rivets 18, of cover plates 1, 2, contact limit edge 35 of intermediate part 5.

Figure 7:
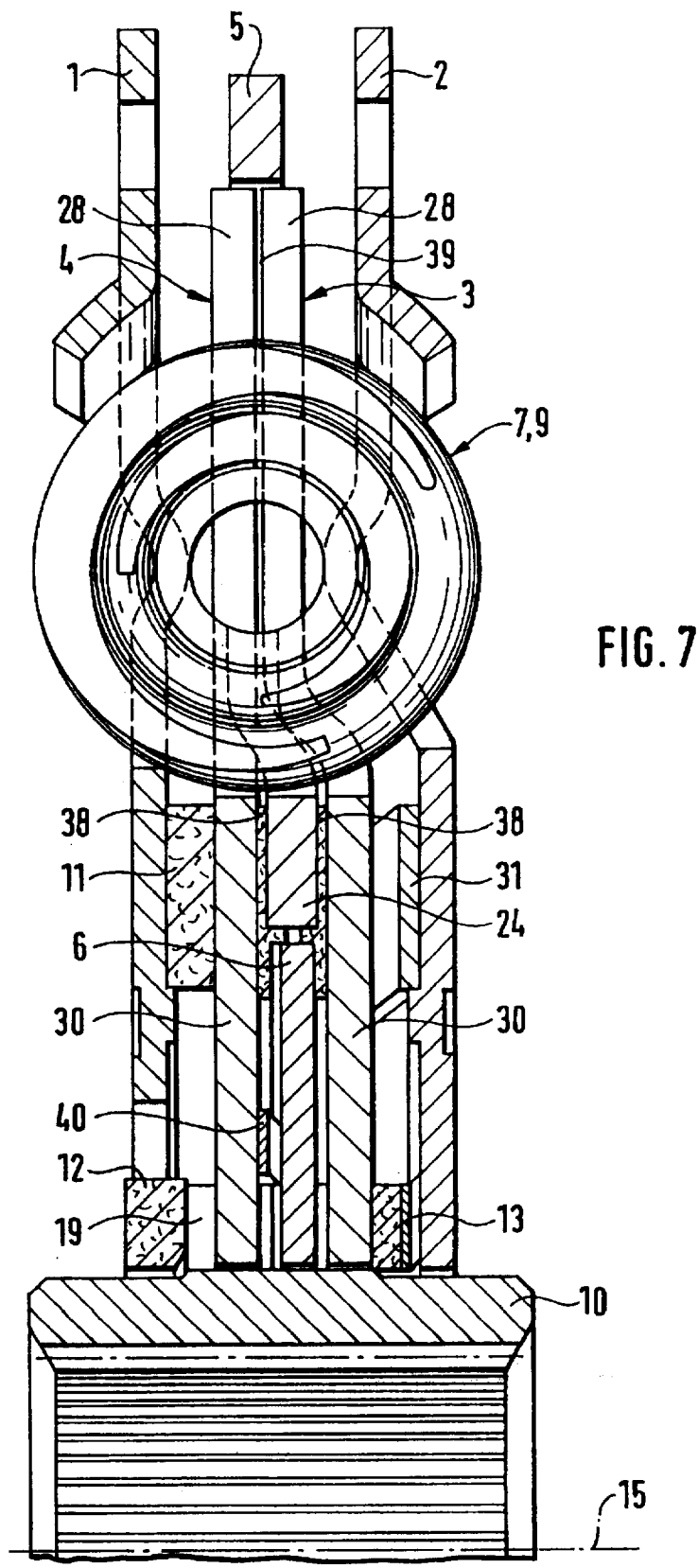
FIG. 7 is the upper half of a longitudinal section through a clutch disc with an idle friction device.

FIG. 7 shows the upper half of a longitudinal section through a clutch disc, the essential construction of which is similar to the one illustrated in FIGS. 1–6. The friction linings 17 have been omitted in FIG. 7 for the sake of simplicity. In contrast to the components disclosed above, FIG. 7 shows the configuration of the components 3 and 4. Of course, from a side view, they are practically identical to the ones illustrated in FIG. 5, but when viewed in cross section it becomes apparent that the component 4 can be planar over its entire radial extent, and the component 3 is preferably bent at substantially a right angle in the vicinity of the control arms 28, namely toward the control arms 28 of the output part 4. Accordingly, the intermediate part 5 can also be bent at substantially a right angle axially (which could be a right-angle bend) in its radially inner area, i.e. in the vicinity of the encircling web 24. This substantially right-angle bend could make it possible to move the space required by the components to radially outside the spring elements 7, 9, i.e. to the left in the drawing (FIG. 7), to create space for other components of the friction clutch in which the clutch disc is installed. The control arms 28 of the components 3 and 4 are also configured so that, when they are installed, they can be axially separated from one another by an axial gap 39. They can thereby be non-rotational in the peripheral direction, although such a non-rotational connection is not absolutely necessary. In the axial space between the web 24 of the intermediate part 5 and the inner sides of the disc-shaped areas 30 of the output parts 3 and 4, there can be friction/sliding elements 38 which are preferably made of a suitable plastic material. The thicknesses of the friction/sliding elements 38 are thereby coordinated to the thickness of the web 24 and to the gap 39, so that the web 24 can be clamped in the axial direction between the disc-shaped areas, namely with the interposition of the friction/sliding elements 38. The force can thereby be applied by the ondular washer 31 which can be located between the inner side of the cover plate 2 and the outer side of the disc-shaped area 30 of component 3 located to the right in the drawing. The force of the ondular washer 31 can thereby be transmitted via the cover plate 2, via the non-detachable connecting elements (not shown here, but shown as spacer rivets 18 in FIG. 1) between the two cover plates 1 and 2 to the cover plate 1, and thus to the friction ring 11, which friction ring 11 can be in contact with the outer side of the disc-shaped area 30 of the component 4. By means of an appropriate coordination of the axial force of the ondular washer 31 with the coefficient of friction of the friction/sliding elements 38 with respect to the two output parts 3 and 4, it is thereby possible to create an additional friction device for the load range, but one which is active only in the range of the angle of rotation in which a relative movement takes place between the intermediate part 5 and the two output parts 3 and 4. The friction/sliding elements 38 are in this case continued toward the radial inside so that they still represent an axial guide for the hub disc 6 of the idle spring device 16. The hub disc 6 can then be installed axially loosely in the axial direction between these friction/sliding elements 38, which in turn means that the mutual outside friction between hub disc 6 and friction/sliding elements 38 can be kept very low. However, a controlled idle friction device can also be provided which, in this case, might consist only of the ondular washer 40 which can be located between the hub disc 6 and one of the components 3 or 4 (shown between hub disc 6 and component 4 in FIG. 7). The ondular washer 40 can bring the hub disc 6 into contact with one of the two friction/sliding elements 38, and essentially guarantee a controlled and properly coordinated friction when there would be relative rotation between the hub disc 6 and the components 3 and 4, i.e. in the idle range. This friction can be limited to the idle range, since the two components 3 and 4 would be mobile only in the range of the idle suspension with their internal gear teeth 20 (illustrated in FIGS. 3 and 3a) with respect to the external gear teeth 19 of the hub 10, while the hub disc 6 can preferably be located absolutely non-rotationally on the external gear teeth 19.

Figure 8:
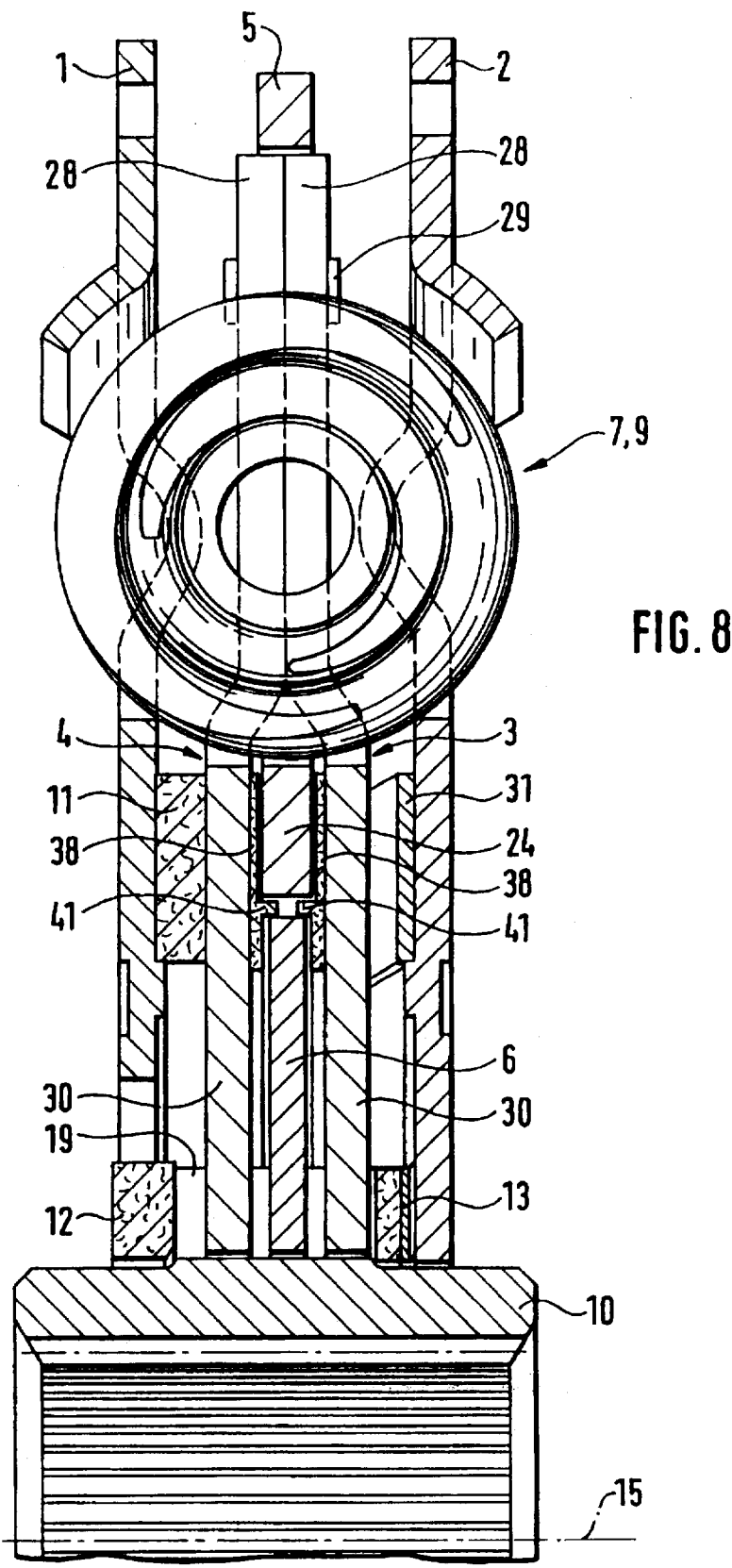
FIG. 8 is the upper half of a longitudinal section through a clutch disc with an intermediate part which is loosely guided axially.

FIG. 8 shows the upper half of a longitudinal section through a clutch disc in which the two output parts 3 and 4 are realized essentially symmetrically, and as in FIGS. 1–6, can be non-detachably connected to one another in the vicinity of their control arms 28 by means of fastening rivets 29. As a result of this non-detachable connection, it is possible to create a prefabricated assembly which would include the two components 3 and 4, the intermediate part 5, the hub disc 6 for the idle spring device, and the spring elements 8 for the idle spring device. This subassembly can be prefabricated separately, as a result of which the relatively small individual parts of the idle spring device essentially can no longer be lost during the installation of the clutch disc. In this case, this subassembly can also include the two friction/sliding elements 38 which would make possible an axial guidance of the intermediate part 5 with respect to the components 3 and 4, but where, on account of the presence of a corresponding axial play, a very low coefficient of friction in the event of relative movement can still be achieved. The friction/sliding elements 38 are thereby provided with webs 41 facing one another, by means of which a radial guidance with respect to the intermediate part 5 can essentially be guaranteed. The friction/sliding elements 38 can be continued inward in terms of their inside diameter far enough that they could also guide the hub disc 6 of the idle spring device in the axial direction. In this case, as shown, there can be a loose axial guidance which could essentially guarantee a very low friction in the event of relative movement, but as shown in FIG. 4, there can also be a controlled idle friction device with a corresponding spring. It is also thereby possible that the friction/sliding elements 38 can be guided by means of their webs 41 on the outside diameter of the hub disc 6.

A controlled idle friction device (noted hereinabove), in this case, might include the ondular washer 40 which can be located between the hub disc 6 and one of the components 3 or 4 (shown between hub disc 6 and component 4 in FIG. 7).

The other components of the clutch disc have already been described in detail in connection with FIGS. 1–7.

One feature of the invention resides broadly in the clutch disc, in particular for a friction clutch in the drive train of a motor vehicle, comprising a friction lining which is non-detachably connected with one of two disc-shaped cover plates which are non-detachably connected to one another and are held at an axial distance from one another as the input part, a disc-shaped component realized as the output part between the two cover plates, which disc-shaped component is non-rotationally connected to a hub, a disc-shaped intermediate part between the two cover plates, spring apertures in the input parts, in the intermediate part and in the output part for the installation of spring elements, whereby one set of spring elements is effectively located between the input parts and the intermediate part, and one set of spring elements is located between the intermediate part and the output part, and thus the respective spring element of the one set and of the other set are connected in series, characterized by the following features: the intermediate part 5 is realized so that it is essentially planar, with at least one inner or outer encircling web 24, 25, from which there proceed webs 26 which run essentially radially and form spring actuator edges, whereby spring apertures 27 are formed peripherally between two neighboring webs 26, each aperture of which locates a spring element 7 of the one set and one spring element 9 of the other set, and between the spring elements 7, 9 there is space for control arms 28 of the output part 3, 4, the output part includes two components 3, 4 which each have control arms 28 which run radially, in the vicinity of which the two components can be non-rotationally connected to one another, whereby the control arms 28 extend at least peripherally into the spring apertures 27 of the intermediate part 5 and form control edges for the spring elements 7, 9, and the control arms 28 end radially inwardly in disc-shaped inner areas 30 which are axially separated from one another at least by the thickness of the intermediate part 5, and the inner areas of which areas are non-rotationally connected to the hub 10, a friction device 11, 31 is located radially inside the spring elements 7, 9 and axially between the inner sides of the cover plates 1, 2 and the outer sides of the inner areas 30 of the components 3, 4 of the output part.

Another feature of the invention resides broadly in the clutch disc characterized by the fact that at least the control arms 28 of one of the two components 3, 4 are bent at a right angle toward the other component, and thus extend axially into the spring apertures 27 of the intermediate part 5.

Yet another feature of the invention resides broadly in the clutch disc characterized by the fact that the control arms 28 of the two components 3, 4 are bent at a right angle toward one another.

Still another feature of the invention resides broadly in the clutch disc characterized by the fact that the friction device includes on one hand a spring such as an ondular washer 31 and on the other hand of at least one friction ring 11.

A further feature of the invention resides broadly in the clutch disc characterized by the fact that the disc-shaped areas 30 of the two components 3, 4 of the output part are non-rotationally engaged by means of internal gear teeth 20 in the external gear teeth 19 of the hub 10.

Another feature of the invention resides broadly in the clutch disc characterized by the fact that the intermediate part 5 has at least one inner encircling web 24, and a hub disc 6 is located axially between the disc-shaped areas 30 and radially inside the web 24, which hub disc 6 is non-rotationally connected to the hub 10 which is part of an idle spring device 16 with spring apertures 36 for the installation of idle spring elements 8 which can be actuated by means of actuator edges 37 in both components 3, 4 of the output part, and the internal gear teeth 20 of the components 3, 4 are engaged in the external gear teeth 19 of the hub 10 with peripheral clearance, or play, corresponding to the range of action of the idle spring device 16.

Yet another feature of the invention resides broadly in the clutch disc characterized by the fact that the hub disc 6 has internal gear teeth 21, by means of which it is engaged without clearance in the peripheral direction on the external gear teeth 19 of the hub 10.

Still another feature of the invention resides broadly in the clutch disc characterized by the fact that the idle spring device 16 is realized in the form of a prefabricated subassembly, comprising at least the two components 3, 4 of the output part which are connected to one another at least in the axial direction, the intermediate part 5, the hub disc 6 and the idle spring elements 8.

A further feature of the invention resides broadly in the clutch disc characterized by the fact that the axial guidance of the components 3, 4 of the output part is provided by the inner areas of the cover plates 1, 2 which are located laterally with respect to the external gear teeth 19 of the hub 10, and by the parts of the friction device 11, 31.

Another feature of the invention resides broadly in the clutch disc characterized by the fact that the one cover plate 1 is guided radially by means of a sliding/friction element 12 on a cylindrical guide diameter of the hub 10, and this sliding/friction element is in contact axially against the end surface of the external gear teeth 19 of the hub 10, and at least one spring element 13 is located between the other cover plate 2 and the corresponding end surface of the external gear teeth 19.

Yet another feature of the invention resides broadly in the clutch disc whereby the intermediate part is provided with at least one radially outer web, characterized by the fact that the control arms 28, in the radially outer areas, have extensions 32 pointing in the peripheral direction, which extensions 32, together with stop edges 33 on the radially outer web 25, represent a stop which provides anti-lock, or anti-jamming, protection for the spring elements 7, 9.

Still another feature of the invention resides broadly in the clutch disc characterized by the fact that the connecting elements of the two cover plates 1, 2 are located in the form of spacer rivets 18 in notches 34, which notches peripherally and are open toward the radial outside in the outer web 25 of the intermediate part 5, and together with the peripheral limit edges 35 of the recesses 34 form stops to provide anti-lock protection for the spring elements 7, 9.

A further feature of the invention resides broadly in the clutch disc characterized by the fact that the intermediate part 5 has at least one inner encircling web 24, by means of which it is guided axially between the inner walls of the disc-shaped areas 30 of the components 3, 4 of the output part, with the interposition of friction/sliding elements 38.

Another feature of the invention resides broadly in the clutch disc characterized by the fact that the control arms 28 of the components 3, 4 are separated from one another by an axial gap 39, and the disc-shaped areas 30 of the components 3, 4 are in contact with one another, with the interposition of the friction/sliding elements 38 and of the web 24, by the force of the ondular washers 31.

Yet another feature of the invention resides broadly in the clutch disc characterized by the fact that the friction/sliding elements 38 are guided radially by means of one-piece webs 41 which run axially and extend into the space between the outside diameter of the hub disc 6 and the inside diameter of the web 24.

Still another feature of the invention resides broadly in the clutch disc characterized by the fact that the intermediate part 5 is guided by means of the webs 41 on the outside diameter of the hub disc 6.

A further feature of the invention resides broadly in the clutch disc characterized by the fact that the hub disc 6 is guided axially between the areas 30 of the components 3, 4.

Another feature of the invention resides broadly in the clutch disc characterized by the fact that the hub disc 6 is realized in the form of a plastic component.

Yet another feature of the invention resides broadly in the clutch disc characterized by the fact that the hub disc 6 functions as a guide element for the intermediate part 5.

Still another feature of the invention resides broadly in the clutch disc characterized by the fact that between the hub disc 6 and one of the areas 30 of the output part there is an ondular washer 40 which generates an idle friction.

A further feature of the invention resides broadly in the clutch disc characterized by the fact that the friction lining 17 has a ratio between its outside diameter $D_A$ and its inside diameter $D_I$ of less than 1.4, and the ratio of the outside diameter $D_A$ of the friction lining 17 to the outside diameter $D_a$ of the cover plates 1, 2 is less than or equal to 1.4.

Another feature of the invention resides broadly in the clutch disc characterized by the fact that at least the springs of one set of spring elements 7, 9 have a ratio of outside diameter to length in the relaxed state which is greater than or equal to 0.7.

Examples of clutches and clutch discs may be found in the following documents: U.S. patent application Ser. No. 08/221,372 filed on Mar. 31, 1994 entitled "FLYWHEEL & CLUTCH SYSTEM", having inventors Bernhard SCHIERLING and Hilmar GOBEL, issued as U.S. Pat. No. 5,476,166 on Dec. 19, 1995, which corresponds to Federal Republic of Germany patent application No. P 43 11 102, filed on Apr. 3, 1993, which corresponds to DE-OS 43 11 102 and DE-PS 43 11 102; U.S. patent application Ser. No. 08/360,455 filed on Dec. 21, 1994 entitled "FRICTION CLUTCH FOR A MOTOR VEHICLE", having inventor Harald JEPPE, which corresponds to Federal Republic of Germany patent application No. P 43 44 124, filed on Dec. 23, 1993, which corresponds to DE-OS 43 44 124 and DE-PS 43 44 124; U.S. patent application Ser. No. 08/405,139 filed on Mar. 16, 1995 entitled "A MOTOR VEHICLE MANUAL TRANSMISSION WITH A CLUTCH WHICH CLUTCH HAS A FASTENING STRUCTURE FOR FASTENING THE LINING SPRING SEGMENTS TO THE DRIVING PLATE", having inventors Jens SCHNEIDER and Harald JEPPE, which corresponds to Federal Republic of Germany patent application No. P 44 09 253, filed on Mar. 18, 1994, which corresponds to DE-OS 44 09 253 and DE-PS 44 09 253; U.S. patent application Ser. No. 08/438,709 filed on May 11, 1995 entitled "CLUTCH ASSEMBLY FOR A MOTOR VEHICLE HAVING A FLEXIBLE CLUTCH DISC", having inventors Joachim LINDNER, Jorg SUDAU, and Bernhard SCHIERLING, which corresponds to Federal Republic of Germany patent application No. P 44 16 949, filed on May 13, 1994, which corresponds to DE-OS 44 16 949 and DE-PS 44 16 949; U.S. patent application Ser. No. 08/499,305 filed on Jul. 7, 1995 entitled "CLUTCH DISC OF A MOTOR VEHICLE, WHICH CLUTCH DISC HAS AN ELASTIC CONNECTION BETWEEN THE CARRIER PLATE & HUB", having inventors Klaus MEMMEL, Gunter WAWRZIK, Winfried STURMER, and Harald JEPPE, which corresponds to Federal Republic of Germany patent application No. P 44 24 186, filed on Jul. 8, 1994, which corresponds to DE-OS 44 24 186 and DE-PS 44 24 186; U.S. patent application Ser. No. 08/502,401 filed on Jul. 14, 1995 entitled "A TRANSMISSION OF AN INTERNAL COMBUSTION ENGINE WITH A CLUTCH WITH A TWO-MASS FLYWHEEL", having inventors Michael WEISS, Jorg SUDAU, Bernhard SCHIERLING, Thomas WIRTH, Jurgen KLEIFGES, Reinhard FELDHAUS, Andreas ORLAMUNDER, and Eberhard KNAUPP, which corresponds to Federal Republic of Germany patent application No. P 195 19 363, filed on May 26, 1995, which corresponds to DE-OS 195 19 363 and DE-PS 195 19 363; U.S. patent application Ser. No. 08/504,848 filed on Jul. 20, 1995 entitled "AIR-COOLED FLYWHEEL & A FRICTION CLUTCH FOR A TRANSMISSION OF A MOTOR VEHICLE, THE FLYWHEEL HAVING TWO CENTRIFUGAL MASSES", having inventors Bernhard SCHIERLING, Rudolf BAUERLEIN, Cora CARLSON, and Hilmar GOBEL, which corresponds to Federal Republic of Germany patent application No. P 44 25 570, filed on Jul. 20, 1994, which corresponds to DE-OS 44 25 570 and DE-PS 44 25 570; U.S. patent application Ser. No. 08/515,263 filed on Aug. 15, 1995 entitled "A FLYWHEEL FOR THE FRICTION CLUTCH OF A MOTOR VEHICLE, THE FLYWHEEL HAVING TWO CENTRIFUGAL MASSES & A FRICTION DEVICE", having inventors Joachim LINDNER and Bernhard SCHIERLING, which corresponds to Federal Republic of Germany patent application No. P 44 28 832, filed on Aug. 17, 1994, which corresponds to DE-OS 44 28 832 and DE-PS 44 28 832; U.S. patent application Ser. No. 08/515,348 filed on Aug. 15, 1995 entitled "FRICTION CLUTCH FOR THE TRANSMISSION OF A MOTOR VEHICLE & A FLYWHEEL ASSEMBLY FOR A FRICTION CLUTCH", having inventors Joachim LINDNER and Bernhard SCHIERLING, which corresponds to Federal Republic of Germany patent application No. P 44 28 829, filed on Aug. 17, 1994, which corresponds to DE-OS 44 28 829 and DE-PS 44 28 829; U.S. patent application Ser. No. 08/518,789 filed on Aug. 23, 1995 entitled "FRICTION CLUTCH ASSEMBLY FOR A MOTOR VEHICLE, THE FRICTION CLUTCH ASSEMBLY HAVING A CLUTCH PLATE WITH DIVIDED HUB DISC", having inventors Klaus MEMMEL, Jurgen KLEIFGES, Reinhard FELDHAUS, and Harald JEPPE, which corresponds to Federal Republic of Germany patent application No. P 44 29 870, filed on Aug. 23, 1994, which corresponds to DE-OS 44 29 870 and DE-PS 44 29 870; and U.S. patent application Ser. No. 08/163,336 filed on Dec. 6, 1993 entitled "TRANSMISSION FOR A MOTOR VEHICLE WITH A FRICTION CLUTCH HAVING A CLUTCH DISC WITH TORSIONALLY LOCKED FRICTION RING", having inventors Norbert AMENT and Harald RAAB, which corresponds to Federal Republic of Germany patent application No. P 42 41 280.3, filed on Dec. 8, 1992, which corresponds to DE-OS 42 41 280.3 and DE-PS 42 41 280.3. These patents and patent applications are hereby incorporated by reference as if set forth in their entirety herein. All of the above U.S. patent documents in this paragraph are assigned to Fichtel & Sachs AG of the Federal Republic of Germany.

Examples of clutch assemblies which could possibly be used in conjunction with the present invention may be disclosed in the following U.S. Patents: U.S. Pat. No. 4,641,736, which issued to Forster on Feb. 10, 1987, entitled "Friction Clutch"; U.S. Pat. No. 5,409,091, which issued to Reik et al. on Apr. 25, 1992, entitled "Automatically Adjustable Friction Clutch"; U.S. Pat. No. 5,333,713, which issued to Hagnere and Warnke on Aug. 2, 1994, entitled "Friction Clutch"; U.S. Pat. No. 4,640,398, which issued to Kolb and Pieper on Feb. 3, 1987, entitled "Friction Clutch with Tangential Leaf Springs"; U.S. Pat. No. 4,646,897, which issued to Winters on Mar. 3, 1987, entitled "Friction Clutch for a Vehicle"; U.S. Pat. No. 4,662,498, which issued to Yanko on May 5, 1987, entitled "Heavy Duty Friction Clutch"; and U.S. Pat. No. 4,753,332, which issued to Bieber and Ebner on Jun. 28, 1988, entitled "Friction Clutch Assembly with Selective Lubrication During the Friction Phase".

Examples of elastomers, rubber, and plastic materials used in conjunction with clutch assemblies can possibly be found in the following U.S. Patents: U.S. Pat. No. 5,249,660, which issued to Feldhaus et al. on Oct. 5, 1993, entitled "Clutch Disc for a Motor Vehicle Friction Clutch"; U.S. Pat. No. 5,209,334, which issued to Fischer et al. on May 11, 1993, entitled "Clutch Disc"; U.S. Pat. No. 5,305,864, which issued to Strohm on Apr. 26, 1994, entitled "Motor Vehicle Clutch Disc"; and U.S. Pat. No. 5,433,307, which issued to Jeppe on Jul. 18, 1995, entitled "Clutch Plate for a Friction Clutch of a Motor Vehicle Having a Radially Elastic Plastic Ring".

Examples of materials having a low coefficient of friction, and which can possibly be utilized with the embodiments of the present invention can possibly be found in the following U.S. Patents: U.S. Pat. No. 4,921,736, which issued to Miller and Morgan on May 1, 1990, entitled "Low Friction, Wear Resistant Plastic Parts"; U.S. Pat. No. 4,948,833, which issued to Araki and Okushiro on Aug. 14, 1990, entitled "Olefinic Resin Composition and Molded Article"; U.S. Pat. No. 4,725,151, which issued to Orndorff, Jr. on Feb. 16, 1988, entitled "Thermoplastic-rubber Polymer Alloys and Method of Producing the Same"; U.S. Pat. No. 4,714,740, which issued to Lee and Golden on Dec. 22, 1987, entitled "Low Coefficient of Friction Nylon Blend"; and U.S. Pat. No. 4,816,516, which issued to Yamaya et al. on Mar. 28, 1989, entitled "Polyimide Resin-fluoropolymer Compositions".

Types of ondular washers are disclosed in U.S. Pat. No. 4,832,320, which issued to Scowen et al. on May 23, 1989; and U.S. Pat. No. 4,778,404, which issued to Pass on Oct. 18, 1988.

Some examples of transmissions in which the present invention may be incorporated may be disclosed by the following U.S. Patents: U.S. Pat. No. 5,199,316 to Hoffman, entitled "Fully-Synchronized Multiple Speed Manual Transmission for Motor Vehicles"; U.S. Pat. No. 4,458,551 to Winter, entitled "Manual Transmission"; and U.S. Pat. No. 3,858,460 to Porter et al., entitled "Four Speed Manual Transmission and Control".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application No. 195 10 833.7, filed on Mar. 24, 1995, having inventor Norbert Lohaus, and DE-OS 195 10 833.7 and DE-PS 195 10 833.7, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch assembly for a friction clutch for a motor vehicle, said friction clutch assembly comprising:

a flywheel;

a clutch housing;

a hub defining an axis of rotation and an axial direction parallel to the axis of rotation;

a clutch disc disposed within said clutch housing, said clutch disc coaxially surrounding said hub;

a pressure plate disposed within said clutch housing and being movable in the axial direction, said pressure plate being disposed to exert an axial force on said clutch disc in the axial direction;

biasing structure to bias said pressure plate in the axial direction;

a hub member;

said hub member being disposed to coaxially surround said hub;

said clutch disc being disposed between said flywheel and said pressure plate;

said clutch disc comprising at least one friction lining;

said at least one friction lining being configured and disposed to contact said pressure plate and said flywheel during engagement of said clutch disc with said flywheel;

said at least one friction lining being disposed substantially between said pressure plate and said flywheel;

said clutch disc further comprising:

at least one disc-shaped component having an axis of rotation and being coaxial with said hub; said at least one disc-shaped component comprising:

a first cover plate comprising at least one aperture;

a second cover plate comprising at least one aperture; and an intermediate part being disposed axially between said first cover plate and said second cover plate, said intermediate part comprising at least one aperture;

said at least one aperture in each of said first cover plate, said second cover plate and said intermediate part comprising a first edge, a second edge, a third edge, and a fourth edge;

said first edge of each said at least one aperture being disposed a first distance from said axis of rotation and said second edge being disposed a second distance from said axis of rotation;

each of said first distances being greater than said second distances;

said third edge and said fourth edge of each said at least one aperture in said first cover plate, said second cover plate and said intermediate part extending substantially radially outward with respect to the axis of rotation and being disposed substantially opposite one another;

a connecting structure;

said first cover plate and said second cover plate being non-rotatably connected one to another by said connecting structure;

said at least one friction lining being disposed on one of said first cover plate and said second cover plate;

said at least one aperture of said first cover plate, said second cover plate, and said intermediate part being aligned with one another;

said aligned at least one aperture of said first cover plate, said second cover plate and said intermediate part forming at least one window;

said clutch disc further comprising at least one spring element;

said at least one spring element having a substantially central longitudinal axis;

said at least one spring element comprising a first end being substantially perpendicular to the longitudinal axis and a second end being substantially perpendicular to the longitudinal axis;

said at least one spring element comprising a plurality of first spring elements and a plurality of second spring elements;

one of said plurality of first spring elements and one of said plurality of second spring elements being disposed within said at least one window;

said first end of said one of said plurality of first spring elements being substantially adjacent each of said third edges of said at least one window;

said first end of said one of said plurality of second spring elements being substantially adjacent each of said fourth edges of said at least one window;

said second end of said one of said plurality of first spring elements and said second end of said one of said plurality of second spring elements facing substantially toward one another;

said at least one window having said one of said plurality of first spring elements and one of said plurality of second spring elements disposed therein being at least one spring window;

said at least one spring window being a plurality of circumferentially spaced spring windows;

said clutch disc further comprising at least one additional component;

said at least one additional component being disposed between said first cover plate and said second cover plate;

said at least one additional component being substantially disc-shaped and having an axis of rotation and being coaxial with said hub;

said at least one additional component comprising an internal portion and an external portion;

said at least one additional component comprising a first disc member and a second disc member;

said first disc member and said second disc member being non-rotationally connected to said hub;

said intermediate part being disposed between said first disc member and said second disc member;

said external portion of said at least one additional component comprising at least one radially outwardly extending arm member;

said at least one arm member extending at least peripherally into said at least one aperture of said intermediate part;

said at least one arm member comprising a plurality of arm members;

said arm members being circumferentially spaced apart from one another;

said arm members each comprising an inner portion, a first edge, a second edge, and a peripheral portion;

said first edge of said arm members being substantially adjacent said second end of said first spring element and said second edge of said arm members being substantially adjacent said second end of said second spring element;

said clutch disc further comprising a friction device disposed within said cover plates to reduce vibrations of elements disposed between said first cover plate and said second cover plate;

said friction device being disposed radially between:
a) said first and second spring elements; and
b) said hub;

said friction device being disposed axially between said at least one additional component and at least one of:
a) said first cover plate; and
b) said second cover plate;

said arm members of one of said disc members comprising a bend, said bend being bent toward the other of said disc members;

said arm members comprising said bend axially extend into said apertures of said intermediate part; and said bend being a substantially right angle bend.

2. The friction clutch assembly according to claim 1, wherein:

said arm members of each of said disc members comprises a bend, said bend of said arm members of each of said disc members being bent toward the other of said disc members; and said bend being a substantially right angle bend.

3. A friction clutch assembly for a friction clutch of a motor vehicle, said friction clutch assembly comprising:

a flywheel;

a clutch housing;

a hub defining an axis of rotation and an axial direction parallel to the axis of rotation;

a clutch disc disposed within said clutch housing, said clutch disc coaxially surrounding said hub;

a pressure plate disposed within said clutch housing and being movable in the axial direction, said pressure plate being disposed to exert an axial force on said clutch disc in the axial direction;

biasing structure to bias said pressure plate in the axial direction;

a hub member;

said hub member being disposed to coaxially surround said hub;

said clutch disc being disposed between said flywheel and said pressure plate;

said clutch disc comprising at least one friction lining;

said at least one friction lining being configured and disposed to contact said pressure plate and said flywheel during engagement of said clutch disc with said flywheel;

said at least one friction lining being disposed substantially between said pressure plate and said flywheel, said clutch disc further comprising:
at least one disc-shaped component having an axis of rotation and being coaxial with said hub; said at least one disc-shaped component comprising:
a first cover plate comprising at least one aperture;
a second cover plate comprising at least one aperture; and an intermediate part being disposed axially between said first cover plate and said second cover plate, said intermediate part comprising at least one aperture;

said at least one aperture in each of said first cover plate, said second cover plate and said intermediate part comprising a first edge, a second edge, a third edge, and a fourth edge;

said first edge of each said at least one aperture being disposed a first distance from said axis of rotation and said second edge being disposed a second distance from said axis of rotation;

each of said first distances being greater than said second distances;

said third edge and said fourth edge of each said at least one aperture in said first cover plate, said second cover plate and said intermediate part extending substantially radially outward with respect to the axis of rotation and being disposed substantially opposite one another;

a connecting structure;

said first cover plate and said second cover plate being non-rotatably connected one to another by said connecting structure;

said at least one friction lining being disposed on one of said first cover plate and said second cover plate;

said at least one aperture of said first cover plate, said second cover plate, and said intermediate part being aligned with one another;

said aligned at least one aperture of said first cover plate, said second cover plate and said intermediate part forming at least one window;

said clutch disc further comprising at least one spring element;

said at least one spring element having a substantially central longitudinal axis;

said at least one spring element comprising a first end being substantially perpendicular to the longitudinal axis and a second end being substantially perpendicular to the longitudinal axis;

said at least one spring element comprising a plurality of first spring elements and a plurality of second spring elements;

one of said plurality of first spring elements and one of said plurality of second spring elements being disposed within said at least one window;

said first end of said one of said plurality of first spring elements being substantially adjacent each of said third edges of said at least one window;

said first end of said one of said plurality of second spring elements being substantially adjacent each of said fourth edges of said at least one window;

said second end of said one of said plurality of first spring elements and said second end of said one of said plurality of second spring elements facing substantially toward one another;

said at least one window having said one of said plurality of first spring elements and one of said plurality of second spring elements disposed therein being at least one spring window;

said at least one spring window being a plurality of circumferentially spaced spring windows;

said clutch disc further comprising at least one additional component;

said at least one additional component being disposed between said first cover plate and said second cover plate;

said at least one additional component being substantially disc-shaped and having an axis of rotation and being coaxial with said hub;

said at least one additional component comprising an internal portion and an external portion;

said at least one additional component comprising a first disc member and a second disc member;

said first disc member and said second disc member being non-rotationally connected to said hub;

said intermediate part being disposed between said first disc member and said second disc member;

said external portion of said at least one additional component comprising at least one radially outwardly extending arm member;

said at least one arm member extending at least peripherally into said at least one aperture of said intermediate part;

said at least one arm member comprising a plurality of arm members;

said arm members being circumferentially spaced apart from one another;

said arm members each comprising an inner portion, a first edge, a second edge, and a peripheral portion;

said first edge of said arm members being substantially adjacent said second end of said first spring element and said second edge of said arm members being substantially adjacent said second end of said second spring element;

said clutch disc further comprising a friction device disposed within said cover plates to reduce vibrations of elements disposed between said first cover plate and said second cover plate;

said friction device being disposed radially between:
 a) said first and second spring elements; and
 b) said hub;

said friction device being disposed axially between said at least one additional component and at least one of:
 a) said first cover plate; and
 b) said second cover plate;

said internal portion of said first disc member comprising an internal contour;

said internal portion of said second disc member comprising an internal contour;

said hub comprising an external contour;

said external contour of said hub comprising means for meshing with said internal contour of said first disc member and said internal contour of said second disc member;

said internal contour of said first disc member comprising means for meshing with said external contour of said hub;

said internal contour of said second disc member comprising means for meshing with said external contour of said hub;

said internal contour of said first disc member being in mesh with said external contour of said hub;

said internal contour of said second disc member being in mesh with said external contour of said hub;

said intermediate part comprising an inner portion;

said inner portion of said intermediate part being disposed radially inwardly from said second edge of said apertures with respect to the axis of rotation;

said inner portion of said intermediate part being disposed to coaxially surround said hub member;

said hub member being disposed axially between said first disc member and said second disc member;

said hub member being fixedly connected to said hub;

said hub member comprising a plurality of openings disposed circumferentially about said hub member with respect to the axis of rotation;

said first disc member comprising a plurality of openings disposed circumferentially about said first disc member with respect to the axis of rotation;

said second disc member comprising a plurality of openings disposed circumferentially about said second disc member with respect to the axis of rotation;

said plurality of openings of each of said hub member, said first disc member, and said second disc member being aligned;

said aligned openings being a plurality of windows;

each one of said plurality of windows having at least one spring device disposed therein;

said means for meshing comprising gear teeth;

said gear teeth being in mesh with clearance at least in the circumferential direction;

said hub member comprising an internal portion and an external portion;

said internal portion comprising an internal contour;

said internal contour of said hub member comprising means for meshing with said external contour of said hub;

said means for meshing with said external contour of said hub comprising gear teeth; and said gear teeth of said hub member being in mesh with said gear teeth of said hub without clearance at least in the circumferential direction.

4. The friction clutch assembly according to claim 3, wherein:

said clutch disc further comprises a pre-assembled spring arrangement;

said pre-assembled spring arrangement comprising:
 said first disc member;
 said second disc member;
 said intermediate part;
 said hub member; and
 said at least one spring device.

5. The friction clutch assembly according to claim 3, wherein:

said first disc member and said second disc member comprise means for axially guiding said hub member; and said means for axially guiding said hub member being said internal portion of said first disc member and said internal portion of said second disc member.

6. A friction clutch assembly for a friction clutch for a motor vehicle, said friction clutch assembly comprising:

a flywheel;

a clutch housing;

a hub defining an axis of rotation and an axial direction parallel to the axis of rotation;

a clutch disc disposed within said clutch housing, said clutch disc coaxially surrounding said hub;

a pressure plate disposed within said clutch housing and being movable in the axial direction, said pressure plate being disposed to exert an axial force on said clutch disc in the axial direction;

biasing structure to bias said pressure plate in the axial direction;

a hub member;

said hub member being disposed to coaxially surround said hub;

said clutch disc being disposed between said flywheel and said pressure plate;

said clutch disc comprising at least one friction lining;

said at least one friction lining being configured and disposed to contact said pressure plate and said flywheel during engagement of said clutch disc with said flywheel;

said at least one friction lining being disposed substantially between said pressure plate and said flywheel;

said clutch disc further comprising:
at least one disc-shaped component having an axis of rotation and being coaxial with said hub;

said at least one disc-shaped component comprising: a first cover plate comprising at least one aperture;
a second cover plate comprising at least one aperture; and
an intermediate part being disposed axially between said first cover plate and said second cover plate, said intermediate part comprising at least one aperture;

said at least one aperture in each of said first cover plate, said second cover plate and said intermediate part comprising a first edge, a second edge, a third edge, and a fourth edge;

said first edge of each said at least one aperture being disposed a first distance from said axis of rotation and said second edge being disposed a second distance from said axis of rotation;

each of said first distances being greater than said second distances;

said third edge and said fourth edge of each said at least one aperture in said first cover plate, said second cover plate and said intermediate part extending substantially radially outward with respect to the axis of rotation and being disposed substantially opposite one another;

a connecting structure;

said first cover plate and said second cover plate being non-rotatably connected one to another by said connecting structure;

said at least one friction lining being disposed on one of said first cover plate and said second cover plate;

said at least one aperture of said first cover plate, said second cover plate, and said intermediate part being aligned with one another;

said aligned at least one aperture of said first cover plate, said second cover plate and said intermediate part forming at least one window;

said clutch disc further comprising at least one spring element;

said at least one spring element having a substantially central longitudinal axis;

said at least one spring element comprising a first end being substantially perpendicular to the longitudinal axis and a second end being substantially perpendicular to the longitudinal axis;

said at least one spring element comprising a plurality of first spring elements and a plurality of second spring elements;

one of said plurality of first spring elements and one of said plurality of second spring elements being disposed within said at least one window;

said first end of said one of said plurality of first spring elements being substantially adjacent each of said third edges of said at least one window;

said first end of said one of said plurality of second spring elements being substantially adjacent each of said fourth edges of said at least one window;

said second end of said one of said plurality of first spring elements and said second end of said one of said plurality of second spring elements facing substantially toward one another;

said at least one window having said one of said plurality of first spring elements and one of said plurality of second spring elements disposed therein being at least one spring window;

said at least one spring window being a plurality of circumferentially spaced spring windows;

said clutch disc further comprises at least one additional component;

said at least one additional component being disposed between said first cover plate and said second cover plate;

said at least one additional component being substantially disc-shaped and having an axis of rotation and being coaxial with said hub;

said at least one additional component comprising an internal portion and an external portion;

said at least one additional component comprises a first disc member and a second disc member;

said first disc member and said second disc member being non-rotationally connected to said hub;

said intermediate part being disposed between said first disc member and said second disc member;

said external portion of said at least one additional component comprising at least one radially outwardly extending arm member;

said at least one arm member extending at least peripherally into said at least one aperture of said intermediate part;

said at least one arm member comprising a plurality of arm members;

said arm members being circumferentially spaced apart from one another;

said arm members each comprising an inner portion, a first edge, a second edge, and a peripheral portion;

said first edge of said arm members being substantially adjacent said second end of said first spring element and said second edge of said arm members being substantially adjacent said second end of said second spring element;

said clutch disc further comprises a friction device disposed within said cover plates to reduce vibrations of elements disposed between said first cover plate and said second cover plate;

said friction device being disposed radially between:
 a) said first and second spring elements; and
 b) said hub;

said friction device being disposed axially between said at least one additional component and at least one of:
 a) said first cover plate; and
 b) said second cover plate;

said friction device comprising at least one corrugated washer and at least one friction ring;

said first disc member and said second disc member being held axially in position by:
 said first cover plate;
 said second cover plate;
 said at least one friction ring; and
 said at least one corrugated washer;

said hub member comprising an internal portion and an external portion;

said internal portion comprising an internal contour;

said internal contour of said hub member comprising gear teeth to mesh with said external contour of said hub;

said gear teeth of said hub member being in mesh with said gear teeth of said hub without clearance at least in the circumferential direction;

said gear teeth of said hub having a first side and a second side;

said first side and said second side being disposed opposite with respect to one another;

said external contour of said hub comprising a guide diameter;

said clutch disc further comprising a sliding frictional element and at least one additional spring element;

said sliding frictional element being disposed on said guide diameter;

said sliding frictional element being for holding said first cover plate radially in position;

said sliding frictional element being axially in contact with said first side of said gear teeth of said hub; and said at least one additional spring element being disposed between:
 said second cover plate; and
 said second side of said gear teeth of said hub.

7. A friction clutch assembly for a friction clutch for a motor vehicle, said friction clutch assembly comprising:
 a flywheel;
 a clutch housing;
 a hub defining an axis of rotation and an axial direction parallel to the axis of rotation;
 a clutch disc disposed within said clutch housing, said clutch disc coaxially surrounding said hub;
 a pressure plate disposed within said clutch housing and being movable in the axial direction, said pressure plate being disposed to exert an axial force on said clutch disc in the axial direction;
 biasing structure to bias said pressure plate in the axial direction;
 a hub member;

said hub member being disposed to coaxially surround said hub;

said clutch disc being disposed between said flywheel and said pressure plate;

said clutch disc comprising at least one friction lining;

said at least one friction lining being configured and disposed to contact said pressure plate and said flywheel during engagement of said clutch disc with said flywheel;

said at least one friction lining being disposed substantially between said pressure plate and said flywheel;

said clutch disc further comprising:
 at least one disc-shaped component having an axis of rotation and being coaxial with said hub;

said at least one disc-shaped component comprising:
 a first cover plate comprising at least one aperture;
 a second cover plate comprising at least one aperture; and
 an intermediate part being disposed axially between said first cover plate and said second cover plate, said intermediate part comprising at least one aperture;

said at least one aperture in each of said first cover plate, said second cover plate and said intermediate part comprising a first edge, a second edge, a third edge, and a fourth edge;

said first edge of each said at least one aperture being disposed a first distance from said axis of rotation and said second edge being disposed a second distance from said axis of rotation;

each of said first distances being greater than said second distances;

said third edge and said fourth edge of each said at least one aperture in said first cover plate, said second cover plate and said intermediate part extending substantially radially outward with respect to the axis of rotation and being disposed substantially opposite one another;

a connecting structure;

said first cover plate and said second cover plate being non-rotatably connected one to another by said connecting structure;

said at least one friction lining being disposed on one of said first cover plate and said second cover plate;

said at least one aperture of said first cover plate, said second cover plate, and said intermediate part being aligned with one another;

said aligned at least one aperture of said first cover plate, said second cover plate and said intermediate part forming at least one window;

said clutch disc further comprising at least one spring element;

said at least one spring element having a substantially central longitudinal axis;

said at least one spring element comprising a first end being substantially perpendicular to the longitudinal axis and a second end being substantially perpendicular to the longitudinal axis;

said at least one spring element comprising a plurality of first spring elements and a plurality of second spring elements;

one of said plurality of first spring elements and one of said plurality of second spring elements being disposed within said at least one window;

said first end of said one of said plurality of first spring elements being substantially adjacent each of said third edges of said at least one window;

said first end of said one of said plurality of second spring elements being substantially adjacent each of said fourth edges of said at least one window;

aid second end of said one of said plurality of first spring elements and said second end of said one of said plurality of second spring elements facing substantially toward one another;

said at least one window having said one of said plurality of first spring elements and one of said plurality of second spring elements disposed therein being at least one spring window;

said at least one spring window being a plurality of circumferentially spaced spring windows;

said clutch disc further comprises at least one additional component;

said at least one additional component being disposed between said first cover plate and said second cover plate;

said at least one additional component being substantially disc-shaped and having an axis of rotation and being coaxial with said hub;

said at least one additional component comprising an internal portion and an external portion;

said at least one additional component comprises a first disc member and a second disc member;

said first disc member and said second disc member being non-rotationally connected to said hub;

said intermediate part being disposed between said first disc member and said second disc member;

said external portion of said at least one additional component comprising at least one radially outwardly extending arm member;

said at least one arm member extending at least peripherally into said at least one aperture of said intermediate part;

said at least one arm member comprising a plurality of arm members;

said arm members being circumferentially spaced apart from one another;

said arm members each comprising an inner portion, a first edge, a second edge, and a peripheral portion;

said first edge of said arm members being substantially adjacent said second end of said first spring element and said second edge of said arm members being substantially adjacent said second end of said second spring element;

said clutch disc further comprising a friction device disposed within said cover plates to reduce vibrations of elements disposed between said first cover plate and said second cover plate;

said friction device being disposed radially between:
a) said first and second spring elements; and
b) said hub;

said friction device being disposed axially between said at least one additional component and at least one of:
a) said first cover plate; and
b) said second cover plate;

said intermediate part comprising an outer portion, a middle portion, and an inner portion;

said inner portion of said intermediate part being disposed radially inwardly from said second edge of said apertures with respect to the axis of rotation;

said inner portion of said intermediate part being disposed to coaxially surround said hub member;

said outer portion being disposed radially outwardly from said inner portion of said intermediate part with respect to the axis of rotation;

said middle portion being disposed between said inner and outer portions of said intermediate part;

said middle portion comprising radially outwardly extending arm members and said apertures;

said arm members being circumferentially spaced apart from one another by said apertures;

each of said arm members comprising an inner portion, a first edge, a second edge, and a peripheral portion;

said first edge of said each of said arm members comprising said third edge of each of said apertures;

said second edge of said each of said arm members comprising said fourth edge of said each of said apertures;

said first edge of said each of said arm members having a first curb and said second edge of each of said arm members having a second curb;

said first curb extending circumferentially into said each of said apertures;

said second curb extending circumferentially into another of said each of said apertures; and said first curb and said second curb being a first means for providing anti-jamming and anti-locking protection for said first and said second spring elements.

8. The friction clutch assembly according to claim 7, wherein:

said outer portion of said intermediate part comprises notches, said notches having an open side, a first end, and a second end;

said open side of each of said notches facing substantially radially outwardly with respect to the axis of rotation and said each of said notches comprises a portion of the circumference of said intermediate part;

said first end and said second end of said each of said notches being spaced circumferentially apart from one another with respect to said notch and said first end and said second end extending substantially radially outwardly;

said connecting means being spacer rivets;

said spacer rivets being disposed within said notches; and said spacer rivets and said notches being second means for providing anti-jamming and anti-locking protection for said spring elements.

9. A friction clutch assembly for a friction clutch of a motor vehicle, said friction clutch assembly comprising:

a flywheel;

a clutch housing;

a hub defining an axis of rotation and an axial direction parallel to the axis of rotation;

a clutch disc disposed within said clutch housing, said clutch disc coaxially surrounding said hub;

a pressure plate disposed within said clutch housing and being movable in the axial direction, said pressure plate being disposed to exert an axial force on said clutch disc in the axial direction;

biasing structure to bias said pressure plate in the axial direction;

a hub member;

said hub member being disposed to coaxially surround said hub;

said clutch disc being disposed between said flywheel and said pressure plate;

said clutch disc comprising at least one friction lining;

said at least one friction lining being configured and disposed to contact said pressure plate and said flywheel during engagement of said clutch disc with said flywheel;

said at least one friction lining being disposed substantially between said pressure plate and said flywheel;

said clutch disc further comprising:
at least one disc-shaped component having an axis of rotation and being coaxial with said hub;

said at least one disc-shaped component comprising:
a first cover plate comprising at least one aperture;
a second cover plate comprising at least one aperture; and
an intermediate part being disposed axially between said first cover plate and said second cover plate, said intermediate part comprising at least one aperture;

said at least one aperture in each of said first cover plate, said second cover plate and said intermediate part comprising a first edge, a second edge, a third edge, and a fourth edge;

said first edge of each said at least one aperture being disposed a first distance from said axis of rotation and said second edge being disposed a second distance from said axis of rotation;

each of said first distances being greater than said second distances;

said third edge and said fourth edge of each said at least one aperture in said first cover plate, said second cover plate and said intermediate part extending substantially radially outward with respect to the axis of rotation and being disposed substantially opposite one another;

a connecting structure;

said first cover plate and said second cover plate being non-rotatably connected one to another by said connecting structure;

said at least one friction lining being disposed on one of said first cover plate and said second cover plate;

said at least one aperture of said first cover plate, said second cover plate, and said intermediate part being aligned with one another;

said aligned at least one aperture of said first cover plate, said second cover plate and said intermediate part forming at least one window;

said clutch disc further comprising at least one spring element;

said at least one spring element having a substantially central longitudinal axis;

said at least one spring element comprising a first end being substantially perpendicular to the longitudinal axis and a second end being substantially perpendicular to the longitudinal axis;

said at least one spring element comprising a plurality of first spring elements and a plurality of second spring elements;

one of said plurality of first spring elements and one of said plurality of second spring elements being disposed within said at least one window;

said first end of said one of said plurality of first spring elements being substantially adjacent each of said third edges of said at least one window;

said first end of said one of said plurality of second spring elements being substantially adjacent each of said fourth edges of said at least one window;

said second end of said one of said plurality of first spring elements and said second end of said one of said plurality of second spring elements facing substantially toward one another;

said at least one window having said one of said plurality of first spring elements and one of said plurality of second spring elements disposed therein being at least one spring window;

said at least one spring window being a plurality of circumferentially spaced spring windows;

said clutch disc further comprising at least one additional component;

said at least one additional component being disposed between said first cover plate and said second cover plate;

said at least one additional component being substantially disc-shaped and having an axis of rotation and being coaxial with said hub;

said at least one additional component comprising an internal portion and an external portion;

said at least one additional component comprising a first disc member and a second disc member;

said first disc member and said second disc member being non-rotationally connected to said hub;

said intermediate part being disposed between said first disc member and said second disc member;

said external portion of said at least one additional component comprising at least one radially outwardly extending arm member;

said at least one arm member extending at least peripherally into said at least one aperture of said intermediate part;

said at least one arm member comprising a plurality of arm members;

said arm members being circumferentially spaced apart from one another;

said arm members each comprising an inner portion, a first edge, a second edge, and a peripheral portion;

said first edge of said arm members being substantially adjacent said second end of said first spring element and said second edge of said arm members being substantially adjacent said second end of said second spring element;

said clutch disc further comprising a friction device disposed within said cover plates to reduce vibrations of elements disposed between said first cover plate and said second cover plate;

said friction device being disposed radially between:
a) said first and second spring elements; and
b) said hub;

said friction device being disposed axially between said at least one additional component and at least one of:
a) said first cover plate; and
b) said second cover plate;

said clutch disc comprising frictional sliding elements;

at least one of said frictional sliding elements being disposed axially between said intermediate part and said first disc member;

at least one other of said frictional sliding elements being disposed axially between said intermediate part and said second disc member;

said arm members of said first disc member being spaced axially apart from said arm members of said second disc member by an axial gap;

said internal portion of said first disc member, said at least one of said frictional sliding elements, said inner portion of said intermediate part, said at least one other of said frictional sliding elements, and said internal portion of said second disc member being in contact with one another by means of a force provided by said at least one corrugated washer;

said external portion of said hub member comprising an external contour;

said frictional sliding elements comprising means for radially guiding said frictional sliding elements;

said means for radially guiding being protruding portions of said frictional sliding elements;

said protruding portions extending substantially axially inward and being disposed radially between:
  at least a portion of said external contour of said hub member; and
  at least a portion of said inner portion of said intermediate part;

said clutch disc comprising means for guiding said intermediate part on said external contour of said hub member; and said means for guiding said intermediate part being said protruding portions.

10. A friction clutch assembly for a friction clutch for a motor vehicle, said friction clutch assembly comprising:

a flywheel;

a clutch housing;

a hub defining an axis of rotation and an axial direction parallel to the axis of rotation;

a clutch disc disposed within said clutch housing, said clutch disc coaxially surrounding said hub;

a pressure plate disposed within said clutch housing and being movable in the axial direction, said pressure plate being disposed to exert an axial force on said clutch disc in the axial direction;

biasing structure to bias said pressure plate in the axial direction;

a hub member;

said hub member being disposed to coaxially surround said hub;

said clutch disc being disposed between said flywheel and said pressure plate, said clutch disc comprising at least one friction lining;

said at least one friction lining being configured and disposed to contact said pressure plate and said flywheel during engagement of said clutch disc with said flywheel;

said at least one friction lining being disposed substantially between said pressure plate and said flywheel;

said clutch disc further comprising:
  at least one disc-shaped component having an axis of rotation and being coaxial with said hub;

said at least one disc-shaped component comprising:
  a first cover plate comprising at least one aperture;
  a second cover plate comprising at least one aperture; and
  an intermediate part being disposed axially between said first cover plate and said second cover plate, said intermediate part comprising at least one aperture;

said at least one aperture in each of said first cover plate, said second cover plate and said intermediate part comprising a first edge, a second edge, a third edge, and a fourth edge;

said first edge of each said at least one aperture being disposed a first distance from said axis of rotation and said second edge being disposed a second distance from said axis of rotation;

each of said first distances being greater than said second distances;

said third edge and said fourth edge of each said at least one aperture in said first cover plate, said second cover plate and said intermediate part extending substantially radially outward with respect to the axis of rotation and being disposed substantially opposite one another;

a connecting structure;

said first cover plate and said second cover plate being non-rotatably connected one to another by said connecting structure;

said at least one friction lining being disposed on one of said first cover plate and said second cover plate;

said at least one aperture of said first cover plate, said second cover plate, and said intermediate part being aligned with one another;

said aligned at least one aperture of said first cover plate, said second cover plate and said intermediate part forming at least one window;

said clutch disc further comprising at least one spring element;

said at least one spring element having a substantially central longitudinal axis;

said at least one spring element comprising a first end being substantially perpendicular to the longitudinal axis and a second end being substantially perpendicular to the longitudinal axis;

said at least one spring element comprising a plurality of first spring elements and a plurality of second spring elements;

one of said plurality of first spring elements and one of said plurality of second spring elements being disposed within said at least one window;

said first end of said one of said plurality of first spring elements being substantially adjacent each of said third edges of said at least one window;

said first end of said one of said plurality of second spring elements being substantially adjacent each of said fourth edges of said at least one window;

said second end of said one of said plurality of first spring elements and said second end of said one of said plurality of second spring elements facing substantially toward one another;

said at least one window having said one of said plurality of first spring elements and one of said plurality of second spring elements disposed therein being at least one spring window;

said at least one spring window being a plurality of circumferentially spaced spring windows;

said clutch disc further comprising at least one additional component;

said at least one additional component being disposed between said first cover plate and said second cover plate;

said at least one additional component being substantially disc-shaped and having an axis of rotation and being coaxial with said hub;

said at least one additional component comprising an internal portion and an external portion;

said at least one additional component comprising a first disc member and a second disc member;

said first disc member and said second disc member being non-rotationally connected to said hub;

said intermediate part being disposed between said first disc member and said second disc member;

said external portion of said at least one additional component comprising at least one radially outwardly extending arm member;

said at least one arm member extending at least peripherally into said at least one aperture of said intermediate part;

said at least one arm member comprising a plurality of arm members;

said arm members being circumferentially spaced apart from one another;

said arm members each comprising an inner portion, a first edge, a second edge, and a peripheral portion;

said first edge of said arm members being substantially adjacent said second end of said first spring element and said second edge of said arm members being substantially adjacent said second end of said second spring element;

said clutch disc further comprises a friction device disposed within said cover plates to reduce vibrations of elements disposed between said first cover plate and said second cover plate;

said friction device being disposed radially between:
a) said first and second spring elements; and
b) said hub;

said friction device being disposed axially between said at least one additional component and at least one of:
a) said first cover plate; and
b) said second cover plate;

said clutch disc comprising frictional sliding elements;

at least one of said frictional sliding elements being disposed axially between said intermediate part and said first disc member;

at least one other of said frictional sliding elements being disposed axially between said intermediate part and said second disc member;

said hub member comprising a plastic material;

said hub member comprising means for guiding said intermediate part;

said friction device comprising at least one corrugated washer; and said at least one corrugated washer being disposed axially between said hub member and at least one of:
said first disc member; and
said second disc member.

11. The friction clutch assembly according to claim 10, wherein:

said at least one friction lining has an inner diameter and an outer diameter;

said inner diameter and said outer diameter having a ratio with respect to one another;

said ratio of said outer diameter of said at least one friction lining to said inner diamter of said at least one friction lining being less than about 1.4;

said cover plates having an outer diameter;

said outer diameter of said at least one friction lining and said outer diameter of said cover plates having a ratio with respect to one another;

said ratio of said outer diameter of said at least one friction lining to said outer diameter of said cover plates being less than or equal to about 1.4; and at least one of:
a) said first spring elements; and
b) said second spring elements;

having a ratio of outer diameter to length, when relaxed, being greater than or equal to about 0.7.

* * * * *